US012585926B2

(12) United States Patent (10) Patent No.: US 12,585,926 B2

Darvish Rouhani et al. (45) Date of Patent: Mar. 24, 2026

(54) ADJUSTING PRECISION AND TOPOLOGY PARAMETERS FOR NEURAL NETWORK TRAINING BASED ON A PERFORMANCE METRIC

(71) Applicant: Microsoft Technology Licensing, LLC, Redmond, WA (US)

(72) Inventors: Bita Darvish Rouhani, Bellevue, WA (US); Eric S. Chung, Woodinville, WA (US); Daniel Lo, Bothell, WA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1304 days.

(21) Appl. No.: 16/237,308

(22) Filed: Dec. 31, 2018

(65) Prior Publication Data

US 2020/0210840 A1 Jul. 2, 2020

(51) Int. Cl.
*G06N 3/063* (2023.01)
*G06F 9/30* (2018.01)
(Continued)

(52) U.S. Cl.
CPC ......... *G06N 3/063* (2013.01); *G06F 9/30025* (2013.01); *G06F 18/217* (2023.01); *G06N 3/047* (2023.01); *G06N 3/084* (2013.01)

(58) Field of Classification Search
CPC ............. G06F 2207/4824; G06F 7/483; G06F 9/30025; G06F 18/217; G06K 9/6262;
(Continued)

(56) References Cited

U.S. PATENT DOCUMENTS

| | | | |
|---|---|---|---|
| 5,283,559 A | 2/1994 | Kalendra et al. | |
| 6,144,977 A | 11/2000 | Giangarra et al. | |

(Continued)

FOREIGN PATENT DOCUMENTS

CN          107636697 A          1/2018

OTHER PUBLICATIONS

Drumond et al., "Training DNNs with Hybrid Block Floating Point", Dec. 2, 2018, arXiv:1804.01526v4, pp. 1-11 (Year: 2018).*

(Continued)

*Primary Examiner* — Brent Johnston Hoover

(74) *Attorney, Agent, or Firm* — Klarquist Sparkman, LLP

(57) ABSTRACT

Apparatus and methods for training neural networks based on a performance metric, including adjusting numerical precision and topology as training progresses are disclosed. In some examples, block floating-point formats having relatively lower accuracy are used during early stages of training. Accuracy of the floating-point format can be increased as training progresses based on a determined performance metric. In some examples, values for the neural network are transformed to normal precision floating-point formats. The performance metric can be determined based on entropy of values for the neural network, accuracy of the neural network, or by other suitable techniques. Accelerator hardware can be used to implement certain implementations, including hardware having direct support for block floating-point formats.

20 Claims, 13 Drawing Sheets

(51) Int. Cl.

| | |
|---|---|
| *G06F 18/21* | (2023.01) |
| *G06N 3/047* | (2023.01) |
| *G06N 3/084* | (2023.01) |

(58) Field of Classification Search
CPC .. G06N 3/0445; G06N 3/0472; G06N 3/0481; G06N 3/063; G06N 3/082; G06N 3/084; G06N 3/044; G06N 3/047; G06N 3/048; G06N 3/0442; G06N 3/0464; G06N 3/0495; G06N 3/09

See application file for complete search history.

(56) References Cited

U.S. PATENT DOCUMENTS

| | | | | |
|---|---|---|---|---|
| 6,708,068 | B1 | 3/2004 | Sakaue | |
| 8,319,738 | B2 | 11/2012 | Taylor | |
| 10,167,800 | B1 | 1/2019 | Chung et al. | |
| 10,366,217 | B2 | 7/2019 | Finzi et al. | |
| 11,537,859 | B2 | 12/2022 | Cassidy | |
| 11,604,647 | B2 | 3/2023 | Sun | |
| 12,165,038 | B2 | 12/2024 | Lo | |
| 2004/0041842 | A1 | 3/2004 | Lippincott | |
| 2006/0209041 | A1 | 9/2006 | Studt et al. | |
| 2007/0258641 | A1* | 11/2007 | Srinivasan | H04N 1/407 |
| | | | | 382/166 |
| 2008/0282046 | A1 | 11/2008 | Yuuki | |
| 2011/0154006 | A1 | 6/2011 | Natu et al. | |
| 2012/0165038 | A1 | 6/2012 | Soma | |
| 2013/0222320 | A1 | 8/2013 | Huang et al. | |
| 2014/0289445 | A1 | 9/2014 | Savich | |
| 2015/0084900 | A1 | 3/2015 | Hodges | |
| 2016/0070414 | A1 | 3/2016 | Shukla et al. | |
| 2016/0098149 | A1 | 4/2016 | Baumgartner | |
| 2016/0328646 | A1 | 11/2016 | Lin et al. | |
| 2018/0157465 | A1 | 6/2018 | Bittner et al. | |
| 2018/0157899 | A1* | 6/2018 | Xu | G06V 40/172 |
| 2018/0322607 | A1 | 11/2018 | Mellempudi et al. | |
| 2018/0341857 | A1* | 11/2018 | Lee | G06N 3/045 |
| 2019/0075301 | A1* | 3/2019 | Chou | H04N 19/132 |
| 2019/0386717 | A1* | 12/2019 | Shattil | H04L 27/2602 |
| 2020/0042287 | A1* | 2/2020 | Chalamalasetti | G06N 3/065 |
| 2020/0202201 | A1* | 6/2020 | Shirahata | G06N 3/063 |
| 2020/0264876 | A1 | 8/2020 | Lo et al. | |
| 2020/0272213 | A1 | 8/2020 | Sridharan et al. | |
| 2025/0061320 | A1 | 2/2025 | Lo | |

OTHER PUBLICATIONS

Na et al., "Speeding up Convolutional Neural Network Training with Dynamic Precision Scaling and Flexible Multiplier-Accumulator", Aug. 8, 2016, ISLPED '16: Proceedings of the 2016 International Symposium on Low Power Electronics and Design, pp. 1-6. (Year: 2016).*

Chakrabarti, et al., "Backprop with Approximate Activations for Memory-efficient Network Training", In Journal of Computing Research Repository, Jan. 23, 2019, 09 Pages.

Krishnamoorthi, Raghuraman, "Quantizing Deep Convolutional Networks for Efficient Inference: A whitepaper", In Journal of Computing Research Repository, Jun. 21, 2018, 36 Pages.

Park, et al., "Value-Aware Quantization for Training and Inference of Neural Networks", In Proceedings of the European Conference on Computer Vision, Sep. 8, 2018, pp. 608-624.

"International Search Report and Written Opinion Issued in PCT Application No. PCT/US2020/015765", Mailed Date: May 15, 2020, 14 Pages.

Wang, et al., "Training Deep Neural Networks with 8-bit Floating Point Numbers", In Journal of Computing Research Repository, Dec. 19, 2018, 11 Pages.

Anonymous, Artificial Intelligence Index 2017 Annual Report, Nov. 2017, 101 pages.

Baydin et al., "Automatic Differentiation in Machine Learning: a Survey," Journal of Machine Learning Research 18 (2018), Feb. 5, 2018, 43 pages (also published as arXiv:1502.05767V4 [cs.SC]Feb. 5, 2018).

Bulcò et al., "In-Place Activated BatchNorm for Memory-Optimized Training of DNNs," 2018 IEEE/CVF Conference on Computer Vision and Pattern Recognition, Jun. 2018, pp. 5639-5647 (also published as arXiv:1712.02616 [cs.CV]).

Burger, "Accelerating Persistent Neural Networks at Datacenter Scale," Microsoft Corporation, 52 pp. accessed Apr. 18, 2018, available at: https://www.microsoft.com/en-us/research/blog/rnicrosoft-unveils-project-brainwave/.

Burger, "Microsoft Unveils Project Brainwave for Real-Time AI," Microsoft Corporation, 3 pp (Aug. 18, 2018).

Chen et al., "Compressing Neural Networks with the Hashing Trick," In International Conference on Machine Learning, pages 2285-2294, 2015 (also cited as arXiv:1504.04788Vl [cs.LG] Apr. 19, 2015).

Chiu et al., State-of-the-art Speech Recognition with Sequence-to-Sequence Models. CoRR, abs/171201769, 2017 (also cited as arXiv:1712.01769V6 [cs.CL]Feb. 23, 2018).

Chung et al., "Serving DNNs in Real Time at Datacenter Scale with Project Brainwave," IEEE Micro Pre-Print, 11 pages accessed Apr. 4, 2018, available at https://www.microsoft.com/en-us/research/uploads/prod/2018/03/rni0218_Chung-2018Mar25.pdf, also published as "Serving DNNs in Real Time at Datacenter Scale with Project Brainwave," IEEE Micro, vol. 38, Issue 2, Mar./Apr. 2018.

Colah, "Understanding LSTM Networks," posted on Aug. 27, 2015, 13 pages.

Courbariaux et al., "Low precision arithmetic for deep learning," also available as arXiv:1412.7024V1, Dec. 2014.

Courbariaux et al., "Binarized Neural Networks: Training Neural Networks with Weights and Activations Constrained to +1 or −1," arXiv preprint arXiv:1602.02830V3, Mar. 2016, 11 pages.

Courbariaux et al., "Binaryconnect: Training Deep Neural Networks with Binary Weights During Propagations," In Proceedings of the 28th International Conference on Neural Information Processing Systems, vol. 2, Dec. 2015, 9 pages.

Courbariaux et al., "Training Deep Neural Networks with Low Precision Multiglications," Sep. 23, 2015, 10 pages.

CS231n Convoiutional Neural Netwofks for Visual Recognition, downloaded from cs231n.github.io/ogtimization-2, Dec. 20, 2018, 9 pages.

Denil et al., Predicting Parameters in Deep Learning, In Advances in Neural Information Processing Sxstems, Dec. 2013, pp. 2148-2156.

Elam et al., "A Block Floating Point Implementation for an N-Point FFT on the TMS320C55X DSP," Texas Instruments Application Report SPRA948, Sep. 2003, 13 pages.

"FFT/IFFT Block Floating Point Scaling," Altera Corporation Application Note 404, Oct. 2005, ver. 1.0, 7 pages.

Goodfellow et al., "Deep Learning," downloaded from http://www.deeplearningbook.org/ on May 2, 2018, (document dated 2016), 766 pages.

Gomez, "Backpropagating an LSTM: A Numerical Example," Apr. 18, 2016, downloaded from medium.com/@aidangomez/let-s-do-this-f9b699de31d9, Dec. 20, 2018, 8 pages.

Gupta et al., "Deep Learning with Limited Numerical Precision," Feb. 9, 2015, 10 pages.

Han et al., "Deep Compression: Compressing Deep Neural Networks with Pruning, Trained Quantization and Huffman Coding," arXiV preprint arXiv:1510.00149V5 [cszCV], Feb. 15 2016, 14 pages.

Hassan et al., "Achieving Human Parity on Automatic Chinese to English News Translation," CoRR, abs/180305567, 2018 (also published as arXiv:1803.05567V2 [cs.CL] Jun. 29, 2018).

He et al., "Deep Residual Learning for Image Recognition," arXiv preprint arXiv:1512.03385v1 [cs.CV] Dec. 10, 2015.

Ioffe et al., "Batch Normalization: Accelerating Deep Network Training by Reducing Internal Covariate Shift," arXiv:1502.03167v3 [cs.LG], Mar. 2015, 11 pages.

(56) References Cited

OTHER PUBLICATIONS

Jain et al., "Gist: Efficient Data Encoding for Deep Neural Network Training," 2018 ACM/IEEE 45th Annual International Symposium on Computer Architecture, Jun. 2018, 14 pages.

Karl N's Blog., "Batch Normalization—What the hey?," Posted on Jun. 7, 2016, downloaded from gab41.1ab41.org/batch-normalization-what-the-hey-d480039a9e3b, Jan. 9, 2019, 7 pages.

Kevin's Blog, "Deriving the Gradient for the Backward Pass of Batch Normalization," Posted on Sep. 14, 2016, downloaded from kevinzakka.github.io/2016/09/14/batch_normalization/, Jan. 9, 2019, 7 pages.

Köster et al., "Flexpoint: An Adaptive Numerical Format for Efficient Training of Deep Neural Networks," In Advances in Neural Information Processing Systems, pp. 1742-1752, 2017 (also published as arXiv:1711.02213v2 [cszLG] Dec. 2, 2017).

Kratzert's Blog, "Understanding the backward pass through Batch Normalization Layer," Posted on Feb. 12, 2016, downloaded from kratzert.github.io/2016/02/12/understanding-the-gradient-flow-through-the-bathchnor. . . on Jan. 9, 2019, 17 pages.

Langhammer et al., "Floating-Point DSP Block Architecture for FPGAs," Proceedings of the 2015 ACM/SIGDA International Symposium on Field-Programmable Gate Arrays, Feb. 2015, pp. 117-125.

Le et al., "Neural Architecture Search with Reinforcement Learning," PowerPoint presentation, 37 pages.

Le, "A Tutorial on Deep Learning, Part 1: Nonlinear Classifiers and the Backgrogagation Algorithm," Dec. 2015, 18 pages.

Le, "A Tutorial on Deep Learning, Part 2: Autoencoders, Convolutional Neural Networks and Recurrent Neural Networks," Oct. 2015, 20 pages.

Lecun et al., "Optimal Brain Damage," In Advances in Neural Information Processing Systems, Nov. 1989, pp. 598-605.

Li et al., "Stochastic Modified Equations and Adaptive Stochastic Gradient Algorithms," Proceedings of the 34th International Conference on Machine Learning, PMLR 70, 2017, 10 pages.

Li et al., "Ternary eight networks," arXiV preprint arXiv:1605.04711v2 [cszCV] Nov. 19, 2016.

Lin et al., "Fixed Point Quantization of Deep Convolutional Networks," In International Conference on Machine Learning, pp. 2849-2858, 2016 (also ublished as arXiv:1511.06393v3 [cs:LG] Jun. 2, 2016).

Liu, "DARTS: Differentiable Architecture Search," arXiv:1806.09055v1 [cs.LG], Jun. 24, 2018, 12 pages.

Mellempudi et al., "Ternary Neural Networks with Fine-Grained Quantization," May 2017, 11 pages.

Mendis et al., "Helium: Lifting High-Performance Stencil Kernals from Stripped x86 Binaries to Halide DSL Code," Proceedings of the 36th ACM SIGPLAN Conference on Programming Languate Design and Implementation, Jun. 2015, pp. 391-402.

Mishra et al., "Apprentice: Using Knowledge Distillation Techniques to Improve Low-Precision Network Accuracy," arXiV preprint arXiv:1711.05852v1 [cs:LG] Nov. 15, 2017.

Muller et al., "Handbook of Floating-Point Arithmetic," Birkhäuser Boston (New York 2010), 78 pages including pp. 269-320.

Nielsen, "Neural Networks and Deep Learning," downloaded from http://neuralnetworksanddeeplearning.com/index.html on May 2, 2018, document dated Dec. 2017, 314 pages.

Nvidia. Nvidia tensorrt optimizer, https://developer.nvidia.com/tensorrt downloaded on Mar. 4, 2019, 9 pages.

Page, "Neural Networks and Deep Learning," www.cs.wise.edu/~dpage/cs760/, 73 pp.

Park et al., "Energy-efficient Neural Network Accelerator Based on Outlier-aware Low-precision Computation," 2018 ACM/IEEE 4th Annual International Symposium on Computer Architecture, Jun. 2018, pp. 688-698.

Rajagopal et al., "Synthesizing a Protocol Converter from Executable Protocol Traces," IEEE Transactions on Computers, vol. 40, No. 4, Apr. 1991, pp. 487-499.

Rajpurkar et al., "SQuAD: 100,000+ Questions for Machine Comprehension of Text," Proceedings of the 2016 Conference on Empirical Methods in Natural Language Processing, Nov. 2016, pp. 2383-2392.

Rastegari et al., "XNOR-Net: ImageNet Classification Using Binary Convolutional Neural Networks," In Proceedings of 14th Annual European Conference on Computer Vision, pp. 525-542. Oct. 2016.

"Russakovsky et al., ""ImageNet Large Scale Visual Recognition Challenge,"" International Journal of Computer Vision (IJCV), vol. 115, Issue 3, Dec. 2015, pp. 211-252 (also published as zrXiv:1409.0575v3 [cs.CV]Jan. 30, 2015)."

Russinovich, "Inside the Microsoft FPGA-based Configurable Cloud," Microsoft Corporation, https://channel9.msdn.com/Events/Build/2017/B8063, 8 pp. (May 8,2017).

Russinovich, "Inside the Microsoft FPGA-based Configurable Cloud," Microsoft Corporation, Powerpoint Presentation; 41 pp. (May 8, 2017).

Smith et al., "A Bayesian Perspective on Generalization and Stochastic Gradient Descent," 6th International Conference on Learning Representations, Apr.-May 2018, 13 pages.

Szegedy et al., "Inception-v4, Inception-ResNet and the Impact of Residual Connections on Learning," arXiv:1602.07261v2, Aug. 23, 2016, 12 pages.

Szegedy et al., "Rethinking the Inception Architecture for Computer Vision," arXiv:1512.00567v3 [cs.CV] Dec. 11, 2015, 10 pages.

Tensorflow-slim image classification model library. https://github.com/tensorflow/models/tree/master/research/slim, downloaded on Mar. 4, 2019, 8 pages.

TITU1994 Blog, "Neural Architecture Search with Controller RNN," downloaded from github.com/titu1994/neural-architecture-search on Jan. 9, 2019, 3 pages.

Vanhoucke et al., "Improving the speed of neural networks on CPUs," In Deep Learning and Unsupervised Feature Learning Workshop, Dec. 2011, 8 pages.

Vucha et al., "Design and FPGA Implementation of Systolic Array Architecture for Matrix Multiplication," International Journal of Computer Applications, vol. 26, No. 3, Jul. 2011, 5 pages.

Weinberger et al., "Feature Hashing for Large Scale Multitask Learning," In Proceedings of the 26th Annual International Conference on Machine Learning, Jun. 2009, 8 pages.

Wen et al., "Learning Structured Sparsity in Deep Neural Networks," In Advances in Neural Information Processing Systems, Dec. 2016, pp. 2074-2082 (also published as arXiv:1608.036654v4 [cs.NE] Oct. 18, 2016).

Wilkinson, "Rounding Errors in Algebraic Processes," Notes on Applied Science No. 32, Department of Scientific and Industrial Research, National Physical Laboratory (United Kingdom) (London 1963), 50 pages including pp. 26-33, 79-91, and 122-139.

Wired, "Microsoft's Internet Business Gets a New Kind of Processor," 11 pp. Apr. 19, 2018, available at: https://www.wired.com/2016/09/microsoft-bets-future-chip-reprogram-fly/.

Xiong et al., "Achieving Human Parity in Conversational Speech Recognition," arXiv:1610.05256v2 [cs:CL] Feb. 17, 2017, 13 pages.

Yeh, "Deriving Batch-Norm Backprop Equations,"downloaded from chrisyeh96.github.io/2017/08/28/deriving-batchnorm-backprop on Dec. 20, 2018, 5 pages.

Zhou et al., "DoReFa-net: Training Low Bitwidth Convolutional Neural Networks with Low Bitwidth Gradients," arXiv:1606.06160v3 [cs.NE] Feb. 2, 2018, 13 pages.

Zoph et al., "Learning Transferable Architectures for Scalable Image Recognition," arXiv.1707.07012v1, Jul. 2017, 14 pages.

Zoph et al., "Neural Architecture Search with Reinforcement Learning," 5th International Conference on Learning Representations, Apr. 2017, 16 pages.

Drumond, et al., "End-to-End DNN Training with Block Floating Point Arithmetic", In Repository of arXiv:1804.01526v2, Apr. 9, 2018, 9 Pages.

Drumond, et al., "Training DNNs with Hybrid Block Floating Point", In Repository of arXiv:1804.01526v4, Dec. 2, 2018, 11 Pages.

Han, et al., "Learning Both Weights and Connections for Efficient Neural Networks", In Repository of arXiv:1506.02626v3, Oct. 30, 2015, 9 Pages.

(56)                    References Cited

OTHER PUBLICATIONS

"International Search Report and Written Opinion Issued in PCT Application No. PCT/US2019/066676", Mailed Date: Apr. 15, 2020, 15 Pages.
Raghavan, et al., "Bit-Regularized Optimization of Neural Nets", In Repository of arXiv:1708.04788, Aug. 16, 2017, 11 Pages.
Song, et al., "Computation Error Analysis of Block Floating Point Arithmetic Oriented Convolution Neural Network Accelerator Design", In Repository of arXiv:1709.07776v2, Nov. 24, 2017, 8 Pages.
Wiedemann, et al., "Entropy-Constrained Training of Deep Neural Network", In Repository of arXiv:1812.07520v2, Dec. 19, 2019, 8 Pages.
Park, et al., "Cell division: weight bit-width reduction technique for convolutional neural network hardware accelerators", In Proceedings of the 24th Asia and South Pacific Design Automation Conference, Jan. 21, 2019, 6 Pages.
Zhao,, et al., "Improving Neural Network Quantization without Retraining using Outlier Channel Splitting", In Proceedings of the 36th International Conference on Machine Learning, May 24, 2019, 10 pages.
"Office Action Issued in Indian Patent Application No. 202147035445", Mailed Date: Feb. 16, 2023, 6 Pages.
Non-Final Office Action mailed on Mar. 14, 2024, in U.S. Appl. No. 16/276,395, 13 pages.
Communication Pursuant to Article 94 (3) EPC Received for European Patent Application No. 19839023.9, mailed on Jan. 2, 2024, 09 pages.
Controller Calibration on Resistive Touch Screens, DMC is a touch screen manufacturer, DMC Co. LTD., Jan. 22, 2019, 2 pages.

First Examination Report Received for Indian Patent Application No. 202147036372, mailed on Feb. 13, 2023, 6 pages.
First Office Action Received for Chinese Application No. 202080014556.X, mailed on Apr. 15, 2024, 24 pages (English Translation Provided).
International Search Report and written Opinion Received for PCT Application No. PCT/US2021/017406, mailed on Apr. 28, 2020, 10 pages.
Intimation of Grant received for Indian patent Application No. 202147035445, mailed on Oct. 10, 2024, 1 Page.
Non-Final Office Action mailed on Apr. 6, 2023, in U.S. Appl. No. 16/276,395, 18 pages.
Non-Final Office Action mailed on Nov. 2, 2020, in U.S. Appl. No. 16/286,098, 10 Pages.
Notice of Allowance mailed on Feb. 24, 2021, in U.S. Appl. No. 16/286,098, 5 pages.
Notice of Allowance mailed on Jul. 30, 2024, in U.S. Appl. No. 16/276,395, 5 pages.
Notification on Grant of Patent Right for Invention Received for Chinese Application No. 202080014556.X, mailed on Oct. 25, 2024, 4 pages (English Translation Provided).
Zoph, et al., "Neural Architecture Search with Reinforcement Learning," In Proceedings of 5th International conference on Learning Representations, Apr. 2017, 16 Pages.
Communication pursuant to Article 94(3) EPC, Received for European Application No. 207083718, mailed on Mar. 20, 2024, 08 pages.
Communication pursuant to Article 94(3) EPC Received for European Application No. 20708371.8, mailed on Jan. 15, 2026, 07 pages.

* cited by examiner

Figure 1:
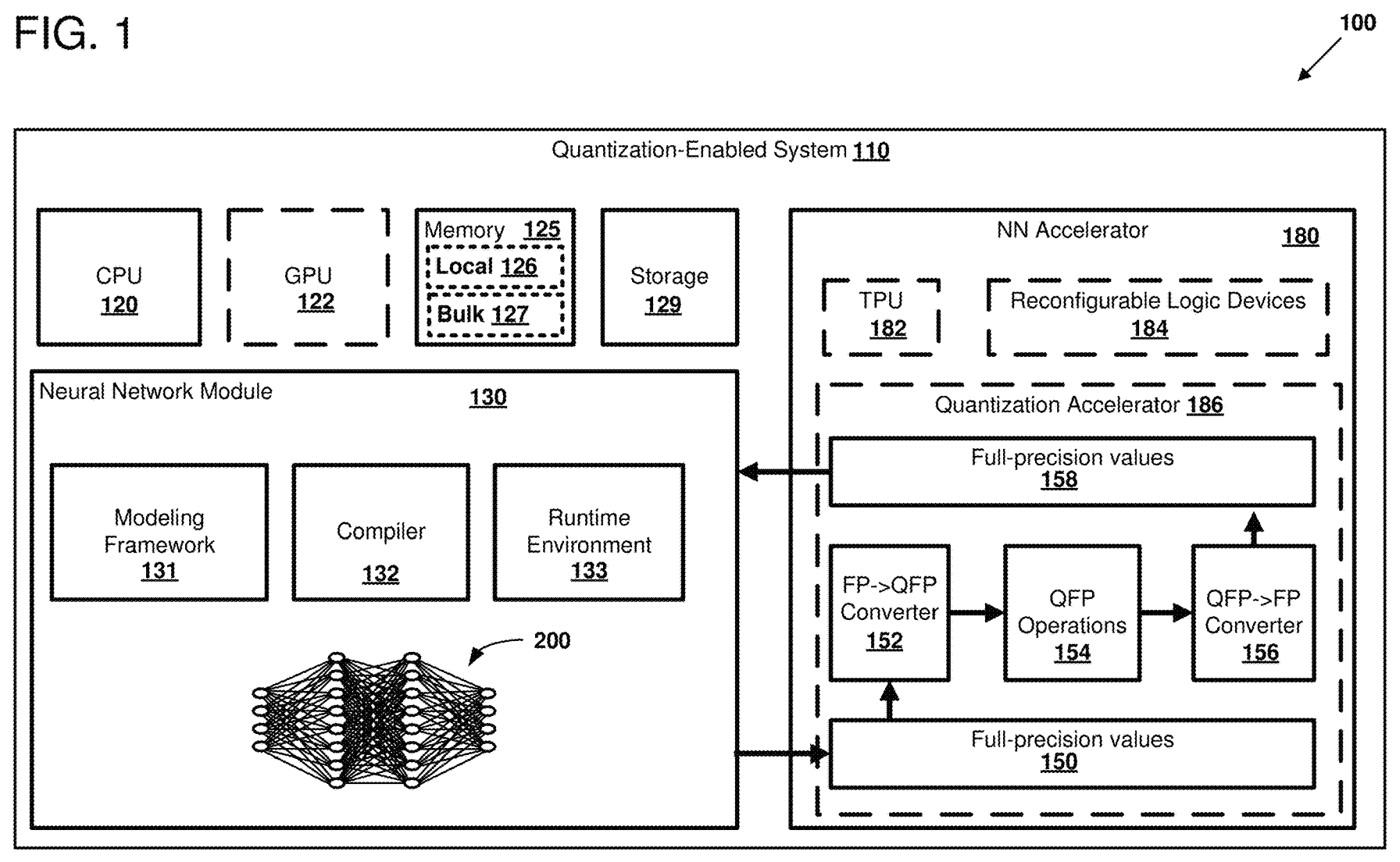

Quantization-Enabled System 110

CPU 120

GPU 122

Memory 125
Local 126
Bulk 127

Storage 129

Neural Network Module 130

Modeling Framework 131

Compiler 132

Runtime Environment 133

200

NN Accelerator 180

TPU 182

Reconfigurable Logic Devices 184

Quantization Accelerator 186

Full-precision values 158

QFP->FP Converter 156

QFP Operations 154

FP->QFP Converter 152

Full-precision values 150

200

240

245

230

235

220

225

226

210

215

216

FIG. 4
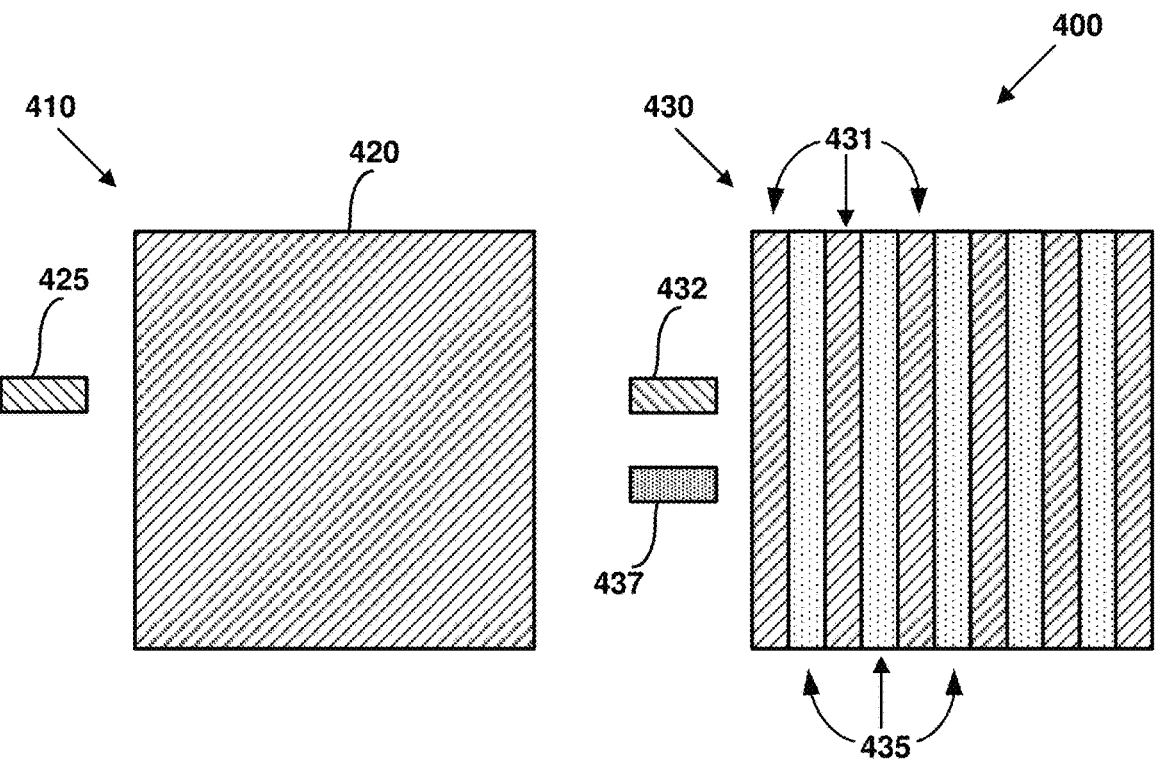
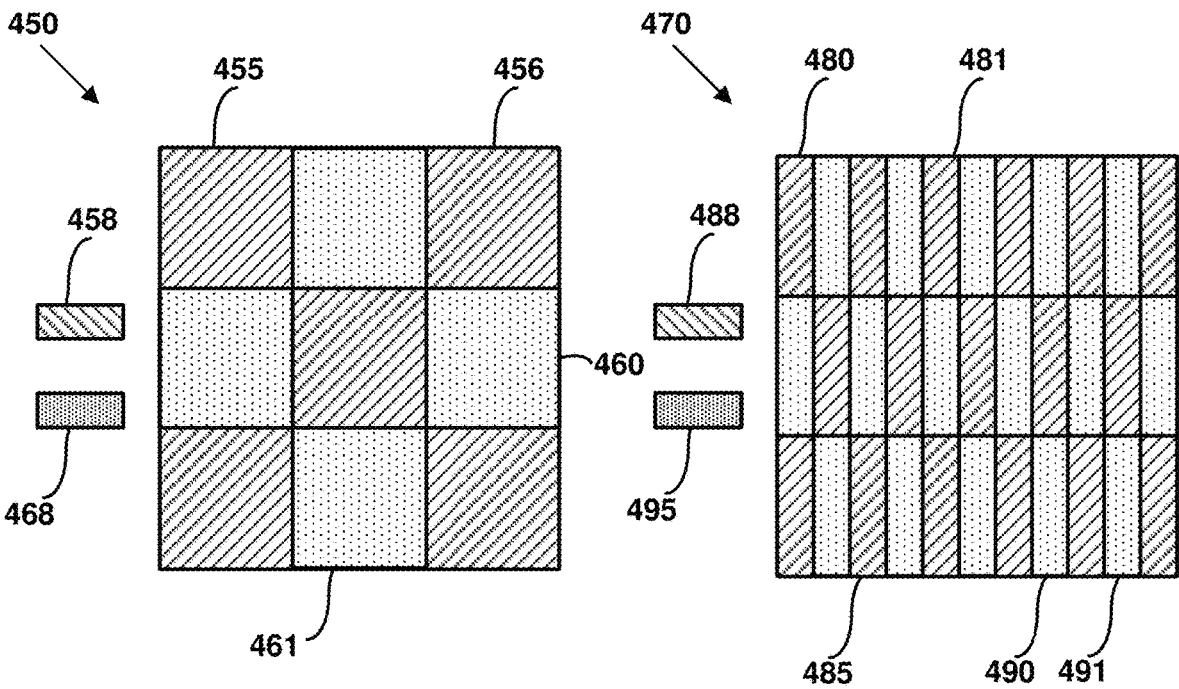

FIG. 6

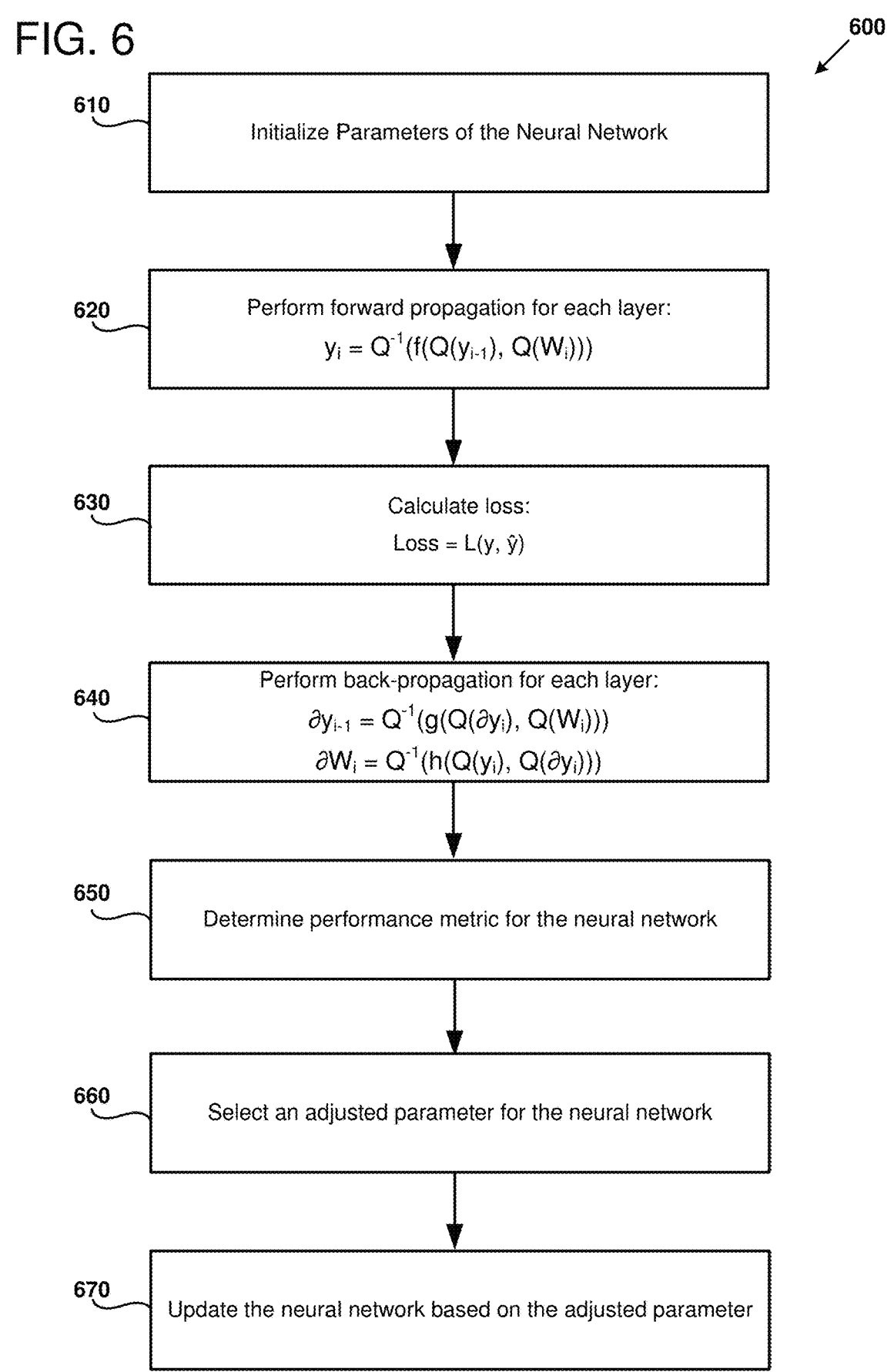

610 — Initialize Parameters of the Neural Network

620 — Perform forward propagation for each layer:
$$y_i = Q^{-1}(f(Q(y_{i-1}), Q(W_i)))$$

630 — Calculate loss:
$$Loss = L(y, \hat{y})$$

640 — Perform back-propagation for each layer:
$$\partial y_{i-1} = Q^{-1}(g(Q(\partial y_i), Q(W_i)))$$
$$\partial W_i = Q^{-1}(h(Q(y_i), Q(\partial y_i)))$$

650 — Determine performance metric for the neural network

660 — Select an adjusted parameter for the neural network

670 — Update the neural network based on the adjusted parameter

600

FIG. 9
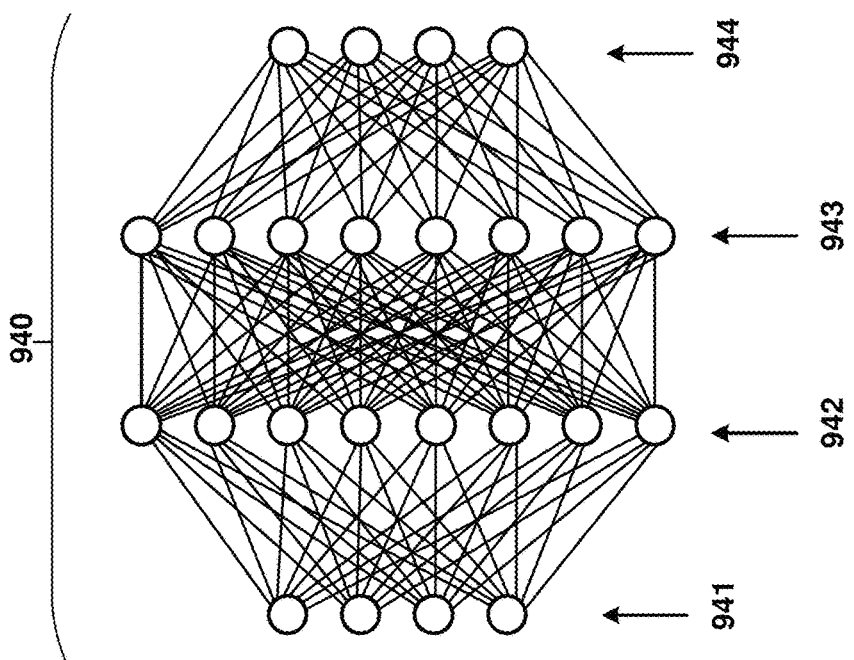
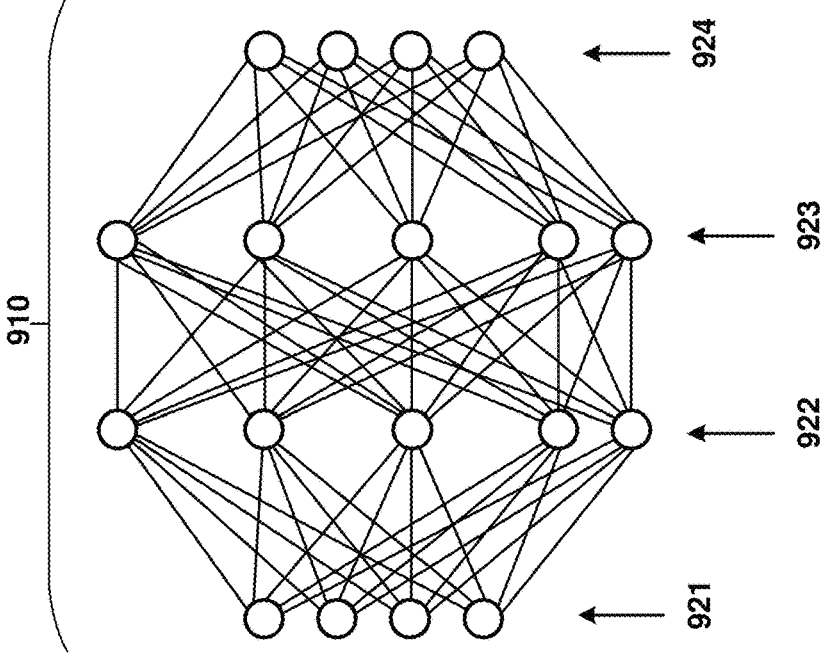

1100

1110 Determine a performance metric for a neural network undergoing training

1120 Select an adjusted precision parameter for the neural network

1130 Modify the neural network based on the adjusted precision parameter

FIG. 12

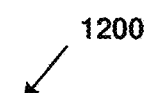
1200

1210

Perform forward propagation for at least one layer of a neural network to propagate activation values for edges of the at least one layer

1220

Perform backward propagation for at least one layer of a neural network to propagate gradients for nodes of the at least one layer

1230

Based on a determined performance metric, adjust a floating point precision parameter of the neural network to improve the performance metric in a neural network having the adjusted parameter

1240

Based on a determined performance metric, adjust a neural network topology parameter to improve the performance metric in a neural network having the adjusted parameter

1250

Store values for the neural network in a memory or storage device

1300

Computing Cloud
1390

Software 1380
For described
technologies

Computing Environment

1330

Processing
Unit(s)
1310

Memory
1320

Communication
Connection(s) 1370

Input Device(s)
1350

Output Device(s)
1360

Storage
1340

Instructions 1380 for
described technologies

ADJUSTING PRECISION AND TOPOLOGY PARAMETERS FOR NEURAL NETWORK TRAINING BASED ON A PERFORMANCE METRIC

BACKGROUND

Machine learning (ML) and artificial intelligence (AI) techniques can be useful for solving a number of complex computational problems such as recognizing images and speech, analyzing and classifying information, and performing various classification tasks. Machine learning is a field of computer science that uses statistical techniques to give computer systems the ability to extract higher-level features from a set of training data. Specifically, the features can be extracted by training a model such as an artificial neural network (NN) or a deep neural network (DNN). After the model is trained, new data can be applied to the model and the new data can be classified (e.g., higher-level features can be extracted) using the trained model. Machine learning models are typically executed on a general-purpose processor (also referred to as a central processing unit (CPU)). However, training the models and/or using the models can be computationally expensive and so it may not be possible to perform feature extraction in real-time using general-purpose processors. Accordingly, there is ample opportunity for improvements in computer hardware and software to implement neural networks.

SUMMARY

Apparatus and methods are disclosed for training artificial neural networks. In particular examples, parameters of the neural network can be adjusted as training proceeds in order to improve a performance metric when the neural network has been configured to use the adjusted parameter. For example, characteristics of the neural network determined during training such as entropy or accuracy can be measured as training proceeds. A performance metric indicating such characteristics is used to adjust neural network parameters such as the topology of the neural network or resolution of values used to represent the neural network. In some examples, very low precision values can be used to represent the neural network during early training. As the neural network converges with subsequent training epochs, the precision of values representing the neural network can be increased based on the performance metric.

Computing systems suitable for employing such neural networks include computers having general-purpose processors, neural network accelerators, or reconfigure both logic devices, such as field programmable gate arrays (FPGA). The activation values, gradient values, and node weights used during training can be expressed in a normal precision or a quantized or block floating-point format (BFP). As training proceeds, the precision of values used in the neural network can be increased based on a performance metric. For example, values can be first represented in a lower precision block floating-point format, and the number of bits used to represent mantissas can be increased as training progresses. In some examples, the neural network can be adjusted to use normal precision floating-point, after performing some training steps using block floating-point values. In some examples of the disclosed technology, a computer system includes general-purpose and/or special-purpose neural network processors, and memory, including computer-readable storage devices or memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 1 is a block diagram of a quantization-enabled system for adjusting parameters of a neural network during training, as can be implemented in certain examples of the disclosed technology.

FIG. 4 depicts a number of example block floating-point formats that can be used to represent quantized neural network models, as can be used in certain examples of the disclosed technology.

FIG. 6 is a flow chart depicting an example method of training a neural network for use with a quantized model, as can be implemented in certain examples of the disclosed technology.

FIG. 9 illustrates an example adjustment of a neural network topology, as can be performed in certain examples of the disclosed technology.

FIG. 12 is a flowchart outlining an example method of performing forward propagation and backward propagation operations during training of a neural network, including adjusting floating-point precision parameters and neural network topology parameters during training, as can be performed in certain examples of the disclosed technology.

DETAILED DESCRIPTION

I. General Considerations

Figure 2:
FIG. 2 is a diagram depicting an example of a deep neural network, as can be modeled using certain example methods and apparatus disclosed herein.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "verify," "execute," "perform," "convert," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Overview of Quantized Artificial Neural Networks

Artificial Neural Networks (ANNs or as used throughout herein, "NNs") are applied to a number of applications in Artificial Intelligence and Machine Learning including image recognition, speech recognition, search engines, and other suitable applications. The processing for these applications may take place on individual devices such as personal computers or cell phones, but it may also be performed in large datacenters. At the same time, hardware accelerators that can be used with NNs include specialized NN processing units, such as tensor processing units (TPUs) and Field Programmable Gate Arrays (FPGAs) programmed to accelerate neural network processing. Such hardware devices are being deployed in consumer devices as well as in data centers due to their flexible nature and low power consumption per unit computation.

Traditionally NNs have been trained and deployed using single-precision floating-point (32-bit floating-point or float32 format). However, it has been shown that lower precision floating-point formats, such as 16-bit floating-point (float16) or fixed-point formats can be used to perform inference operations with minimal loss in accuracy. On specialized hardware, such as FPGAs, reduced precision formats can greatly improve the latency and throughput of DNN processing. In particular, performing training of neural networks using reduced precision formats can accelerate training, especially in early training epochs.

Numbers represented in normal-precision floating-point format (e.g., a floating-point number expresses in a 16-bit floating-point format, a 32-bit floating-point format, a 64-bit floating-point format, or an 80-bit floating-point format) can be converted to quantized-precision format numbers, which may allow for performance benefits in performing operations. In particular, NN weights and activation values can be represented in a lower-precision quantized format with an acceptable level of error introduced. Examples of lower-precision quantized formats include formats having a reduced bit width (including by reducing the number of bits used to represent a number's mantissa or exponent) and block floating-point formats where two or more numbers share the same single exponent.

One of the characteristics of computation on an FPGA device is that it typically lacks hardware floating-point support. Floating-point operations may be performed at a penalty using the flexible logic, but often the amount of logic needed to support floating-point is prohibitive in FPGA implementations. Some newer FPGAs have been developed that do support floating-point computation, but even on these the same device can produce twice as many computational outputs per unit time as when it is used in an integer mode. Typically, NNs are created with floating-point computation in mind, but when an FPGA is targeted for NN processing it would be beneficial if the neural network could be expressed using integer arithmetic. Examples of the disclosed technology include hardware implementations of block floating-point (BFP), including the use of BFP in NN, FPGA, and other hardware environments.

A typical floating-point representation in a computer system consists of three parts: sign (s), exponent (e), and mantissa (m). The sign indicates if the number is positive or negative. The exponent and mantissa are used as in scientific notation:

$$Value = s \times m \times 2^e \qquad (Eq.1)$$

Any number may be represented, within the precision limits of the mantissa. Since the exponent scales the mantissa by powers of 2, just as the exponent does by powers of 10 in scientific notation, the magnitudes of very large numbers may be represented. The precision of the representation is determined by the precision of the mantissa. Typical floating-point representations use a mantissa of 10 (float 16), 24 (float 32), or 53 (float64) bits in width. An integer with magnitude greater than $2^{53}$ can be approximated in a float64 floating-point format, but it will not be represented exactly because there are not enough bits in the mantissa. A similar effect can occur for arbitrary fractions where the fraction is represented by bits of the mantissa that take on the value of negative powers of 2. There are many fractions that cannot be exactly represented because they are irrational in a binary number system. More exact representations are possible in both situations, but they may require the mantissa to contain more bits. Ultimately, an infinite number of mantissa bits are required to represent some numbers exactly (e.g., $1/3=0.\overline{3}$; $22/7=3.\overline{142857}$). The 10-bit (half precision float), 24-bit (single precision float), and 53-bit (double precision float) mantissa limits are common compromises of mantissa storage requirements versus representation precision in general-purpose computers.

With block floating-point formats, a group of two or more numbers use a single shared exponent with each number still having its own sign and mantissa. In some examples, the shared exponent is chosen to be the largest exponent of the original floating-point values. For purposes of the present disclosure, the term block floating-point (BFP) means a number system in which a single exponent is shared across two or more values, each of which is represented by a sign and mantissa pair (whether there is an explicit sign bit, or the mantissa itself is signed). In some examples, all values of one or more rows or columns of a matrix or vector, or all values of a matrix or vector, can share a common exponent. In other examples, the BFP representation may be unsigned. In some examples, some but not all of the elements in a matrix or vector BFP representation may include numbers represented as integers, floating-point numbers, fixed point numbers, symbols, or other data formats mixed with numbers represented with a sign, mantissa, and exponent. In some examples, some or all of the elements in a matrix or vector BFP representation can include complex elements having two or more parts, for example: complex numbers with an imaginary component ($a+bi$, where $i=\sqrt{-1}$); fractions including a numerator and denominator, in polar coordinates ($r$, $\theta$), or other multi-component element.

Parameters of particular BFP formats can be selected for a particular implementation to tradeoff precision and storage requirements. For example, rather than storing an exponent with every floating-point number, a group of numbers can share the same exponent. To share exponents while maintaining a high level of accuracy, the numbers should have close to the same magnitude, since differences in magnitude are expressed in the mantissa. If the differences in magnitude are too great, the mantissa will overflow for the large values, or may be zero ("underflow") for the smaller values. Depending on a particular application, some amount of overflow and/or underflow may be acceptable.

The size of the mantissa can be adjusted to fit a particular application. This can affect the precision of the number being represented, but potential gains are realized from a reduced representation size. For example, a normal single-precision float has a size of four bytes, but for certain implementations of the disclosed technology, only two bytes are used to represent the sign and mantissa of each value. In some implementations, the sign and mantissa of each value can be represented in a byte or less.

In certain examples of the disclosed technology, the representation expressed above is used to derive the original number from the representation, but only a single exponent is stored for a group of numbers, each of which is represented by a signed mantissa. Each signed mantissa can be represented by two bytes or less, so in comparison to four-byte floating-point, the memory storage savings is about 2×. Further, the memory bandwidth requirements of loading and storing these values are also approximately one-half that of normal floating-point.

Neural network operations are used in many artificial intelligence operations. Often, the bulk of the processing operations performed in implementing a neural network is in performing Matrix×Matrix or Matrix×Vector multiplications or convolution operations. Such operations are compute- and memory-bandwidth intensive, where the size of a matrix may be, for example, 1000×1000 elements (e.g., 1000×1000 numbers, each including a sign, mantissa, and exponent) or larger and there are many matrices used. As discussed herein, BFP techniques can be applied to such operations to reduce the demands for computation as well as memory bandwidth in a given system, whether it is an FPGA, CPU, or another hardware platform. As used herein, the use of the term "element" herein refers to a member of such a matrix or vector.

As used herein, the term "tensor" refers to a multi-dimensional array that can be used to represent properties of a NN and includes one-dimensional vectors as well as two-, three-, four-, or larger dimension matrices. As used in this disclosure, tensors do not require any other mathematical properties unless specifically stated.

As used herein, the term "normal-precision floating-point" refers to a floating-point number format having a mantissa, exponent, and optionally a sign and which is natively supported by a native or virtual CPU. Examples of normal-precision floating-point formats include, but are not limited to, IEEE 754 standard formats such as 16-bit, 32-bit, 64-bit, or to other processors supported by a processor, such as Intel AVX, AVX2, IA32, x86_64, or 80-bit floating-point formats.

A given number can be represented using different precision (e.g., different quantized precision) formats. For example, a number can be represented in a higher precision format (e.g., float32) and a lower precision format (e.g., float16). Lowering the precision of a number can include reducing the number of bits used to represent the mantissa or exponent of the number. Additionally, lowering the precision of a number can include reducing the range of values that can be used to represent an exponent of the number, such as when multiple numbers share a common exponent. Similarly, increasing the precision of a number can include increasing the number of bits used to represent the mantissa or exponent of the number. Additionally, increasing the precision of a number can include increasing the range of values that can be used to represent an exponent of the number, such as when a number is separated from a group of numbers that shared a common exponent. As used herein, converting a number from a higher precision format to a lower precision format may be referred to as down-casting or quantizing the number. Converting a number from a lower precision format to a higher precision format may be referred to as up-casting or de-quantizing the number. Converting a number from a first block floating-point format having a first precision to a second block floating-point format having a second precision may be referred to as transforming or re-quantizing the number. Such re-quantizing can transform a number from a lower number of mantissa bits to a higher number of mantissa bits, vice versa, or transform other aspects of a number, such as number of bits used to represent an exponent or sharing schemes for block floating-point formats. Hardware resources and energy used to process lower precision numbers is generally less than that used to process higher precision format numbers.

As used herein, the term "quantized-precision floating-point" refers to a floating-point number format where two or more values of a tensor have been modified to have a lower precision than when the values are represented in normal-precision floating-point. In particular, many examples of quantized-precision floating-point representations include block floating-point formats, where two or more values of the tensor are represented with reference to a common exponent. The quantized-precision floating-point number can be generated by selecting a common exponent for two, more, or all elements of a tensor and shifting mantissas of individual elements to match the shared, common exponent. In some examples, groups of elements within a tensor can share a common exponent on, for example, a per-row, per-column, per-tile, or other basis.

In one example of the disclosed technology, a neural network accelerator is configured to performing training operations for layers of a neural network, including forward propagation and back propagation. The values of one or more of the neural network layers can be expressed in a quantized format, that has lower precision than normal-precision floating-point formats. For example, block floating-point formats can be used to accelerate computations performed in training and inference operations using the neural network accelerator. Use of quantized formats can improve neural network processing by, for example, allowing for faster hardware, reduced memory overhead, simpler hardware design, reduced energy use, reduced integrated circuit area, cost savings and other technological improvements. It is often desirable that operations be performed to mitigate noise or other inaccuracies introduced by using lower-precision quantized formats. Further, portions of neural network training, such as temporary storage of activation values, can be improved by compressing a portion of these values (e.g., for an input, hidden, or output layer of a neural network), either from normal-precision floating-point or from a first block floating-point, to a lower precision number format. The activation values can be later retrieved for use during, for example, back propagation during the training phase.

An input tensor for the given layer can be converted from a normal-precision floating-point format to a quantized-precision floating-point format. A tensor operation can be performed using the converted input tensor. A result of the tensor operation can be converted from the block floating-point format to the normal-precision floating-point format. The tensor operation can be performed during a forward-propagation mode or a back-propagation mode of the neural network. For example, during a back-propagation mode, the input tensor can be an output error term from a layer adjacent to (e.g., following) the given layer or weights of the given layer. As another example, during a forward-propagation mode, the input tensor can be an output term from a layer adjacent to (e.g., preceding) the given layer or weights of the given layer. The converted result can be used to generate an output tensor of the layer of the neural network, where the output tensor is in normal-precision floating-point format. In this manner, the neural network accelerator can potentially be made smaller and more efficient than a comparable accelerator that uses only a normal-precision floating-point format. A smaller and more efficient accelerator may have increased computational performance and/or increased energy efficiency. Additionally, the neural network accelerator can potentially have increased accuracy compared to an accelerator that uses only a quantized-precision floating-point format. By increasing the accuracy of the accelerator, a convergence time for training may be decreased and the accelerator may be more accurate when classifying inputs to the neural network. Reducing the computational complexity of using the models can potentially decrease the time to extract a feature during inference, decrease the time for adjustment during training, and/or reduce energy consumption during training and/or inference.

III. Example Architectures for Implementing

Activation Compression with Narrow Block Floating-Point

FIG. 1 is a block diagram 100 outlining an example quantization-enabled system 110 as can be implemented in certain examples of the disclosed technology, including for use in activation compression with narrow block floating-point. As shown in FIG. 1, the quantization-enabled system 110 can include a number of hardware resources including general-purpose processors 120 and special-purpose processors such as graphics processing units 122 and neural network accelerator 180. The processors are coupled to memory 125 and storage 129, which can include volatile or non-volatile memory devices. The processors 120 and 122 execute instructions stored in the memory or storage in order to provide a neural network module 130. The neural network module 130 includes software interfaces that allow the system to be programmed to implement various types of neural networks. For example, software functions can be provided that allow applications to define neural networks including weights, biases, activation functions, node values, and interconnections between layers of a neural network. Additionally, software functions can be used to define state elements for recurrent neural networks. The neural network module 130 can further provide utilities to allow for training and retraining of a neural network implemented with the module. Values representing the neural network module are stored in memory or storage and are operated on by instructions executed by one of the processors. The values stored in memory or storage can be represented using normal-precision floating-point and/or quantized floating-point values.

In some examples, proprietary or open source libraries or frameworks are provided to a programmer to implement neural network creation, training, and evaluation. Examples of such libraries include TensorFlow, Microsoft Cognitive Toolkit (CNTK), Caffe, Theano, and Keras. In some examples, programming tools such as integrated development environments provide support for programmers and users to define, compile, and evaluate NNs.

The neural network accelerator 180 can be implemented as a custom or application-specific integrated circuit (e.g., including a system-on-chip (SoC) integrated circuit), as a field programmable gate array (FPGA) or other reconfigurable logic, or as a soft processor virtual machine hosted by a physical, general-purpose processor. The neural network accelerator 180 can include a tensor processing unit 182, reconfigurable logic devices 184, and/or one or more neural processing cores (such as the quantization accelerator 186). The quantization accelerator 186 can be configured in hardware, software, or a combination of hardware and software. As one example, the quantization accelerator 186 can be configured and/or executed using instructions executable on the tensor processing unit 182. As another example, the quantization accelerator 186 can be configured by programming reconfigurable logic blocks 184. As another example, the quantization accelerator 186 can be configured using hard-wired logic gates of the neural network accelerator 180.

The quantization accelerator 186 can be programmed to execute a subgraph, an individual layer, or a plurality of layers of a neural network. For example, the quantization accelerator 186 can be programmed to perform operations for all or a portion of a layer of a NN. The quantization accelerator 186 can access a local memory used for storing weights, biases, input values, output values, forget values, state values, and so forth. The quantization accelerator 186 can have many inputs, where each input can be weighted by a different weight value. For example, the quantization accelerator 186 can produce a dot product of an input tensor and the programmed input weights for the quantization accelerator 186. In some examples, the dot product can be adjusted by a bias value before it is used as an input to an activation function. The output of the quantization accelerator 186 can be stored in the local memory, where the output value can be accessed and sent to a different NN processor core and/or to the neural network module 130 or the memory 125, for example. Intermediate values in the quantization accelerator can often be stored in a smaller or more local memory, while values that may not be needed until later in a training process can be stored in a "bulk memory" a larger, less local memory (or storage device, such as on an SSD (solid state drive) or hard drive). For example, during training forward propagation, once activation values for a next layer in the NN have been calculated, those values may not be accessed until for propagation through all layers has completed. Such activation values can be stored in such a bulk memory.

The neural network accelerator 180 can include a plurality 110 of quantization accelerators 186 that are connected to each other via an interconnect (not shown). The interconnect can carry data and control signals between individual quantization accelerators 186, a memory interface (not shown), and an input/output (I/O) interface (not shown). The interconnect can transmit and receive signals using electrical, optical, magnetic, or other suitable communication technology and can provide communication connections arranged according to a number of different topologies, depending on a particular desired configuration. For example, the interconnect can have a crossbar, a bus, a point-to-point bus, or other suitable topology. In some examples, any one of the plurality of quantization accelerators 186 can be connected to any of the other cores, while in other examples, some cores are only connected to a subset of the other cores. For example, each core may only be connected to a nearest 4, 8, or 10 neighboring cores. The interconnect can be used to transmit input/output data to and from the quantization accelerators 186, as well as transmit control signals and other information signals to and from the quantization accelerators 186. For example, each of the quantization accelerators 186 can receive and transmit semaphores that indicate the execution status of operations currently being performed by each of the respective quantization accelerators 186. Further, matrix and vector values can be shared between quantization accelerators 186 via the interconnect. In some examples, the interconnect is implemented as wires connecting the quantization accelerators 186 and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from neural network accelerator 180 are not limited to full swing electrical digital signals, but the neural network accelerator 180 can be configured to include differential signals, pulsed signals, or other suitable signals for transmitting data and control signals.

In some examples, the quantization-enabled system 110 can include an optional quantization emulator that emulates functions of the neural network accelerator 180. The neural network accelerator 180 provides functionality that can be used to convert data represented in full precision floating-point formats in the neural network module 130 into quantized format values. The neural network accelerator 180 can also perform operations using quantized format values. Such functionality will be discussed in further detail below.

The neural network module 130 can be used to specify, train, and evaluate a neural network model using a tool flow that includes a hardware-agnostic modelling framework 131 (also referred to as a native framework or a machine learning execution engine), a neural network compiler 132, and a neural network runtime environment 133. The memory includes computer-executable instructions for the tool flow including the modelling framework 131, the neural network compiler 132, and the neural network runtime environment 133. The tool flow can be used to generate neural network data 200 representing all or a portion of the neural network model, such as the neural network model discussed below regarding FIG. 2. It should be noted that while the tool flow is described as having three separate tools (131, 132, and 133), the tool flow can have fewer or more tools in various examples. For example, the functions of the different tools (131, 132, and 133) can be combined into a single modelling and execution environment. In other examples, where a neural network accelerator is deployed, such a modeling framework may not be included.

The neural network data 200 can be stored in the memory 125, which can include local memory 126, which is typically implemented as static read only memory (SRAM), embedded dynamic ram (eDRAM), in latches or flip-flops in a register file, in a block RAM, or other suitable structure, and bulk memory 127, which is typically implemented in memory structures supporting larger, but often slower access than the local memory 126. For example, the bulk memory may be off-chip DRAM, network accessible RAM, SSD drives, hard drives, or network-accessible storage. Depending on a particular memory technology available, other memory structures, including the foregoing structures recited for the local memory, may be used to implement bulk memory. The neural network data 200 can be represented in one or more formats. For example, the neural network data 200 corresponding to a given neural network model can have a different format associated with each respective tool of the tool flow. Generally, the neural network data 200 can include a description of nodes, edges, groupings, weights, biases, activation functions, and/or tensor values. As a specific example, the neural network data 200 can include source code, executable code, metadata, configuration data, data structures and/or files for representing the neural network model.

The modelling framework 131 can be used to define and use a neural network model. As one example, the modelling framework 131 can include pre-defined APIs and/or programming primitives that can be used to specify one or more aspects of the neural network model. The pre-defined APIs can include both lower-level APIs (e.g., activation functions, cost or error functions, nodes, edges, and tensors) and higher-level APIs (e.g., layers, convolutional neural networks, recurrent neural networks, linear classifiers, and so forth). "Source code" can be used as an input to the modelling framework 131 to define a topology of the graph of a given neural network model. In particular, APIs of the modelling framework 131 can be instantiated and interconnected within the source code to specify a complex neural network model. A data scientist can create different neural network models by using different APIs, different numbers of APIs, and interconnecting the APIs in different ways.

In addition to the source code, the memory 125 can also store training data. The training data includes a set of input data for applying to the neural network model 200 and a desired output from the neural network model for each respective dataset of the input data. The modelling framework 131 can be used to train the neural network model with the training data. An output of the training is the weights and biases that are associated with each node of the neural network model. After the neural network model is trained, the modelling framework 131 can be used to classify new data that is applied to the trained neural network model. Specifically, the trained neural network model uses the weights and biases obtained from training to perform classification and recognition tasks on data that has not been used to train the neural network model. The modelling framework 131 can use the CPU 120 and the special-purpose processors (e.g., the GPU 122 and/or the neural network accelerator 180) to execute the neural network model with increased performance as compare with using only the CPU 120. In some examples, the performance can potentially achieve real-time performance for some classification tasks.

The compiler 132 analyzes the source code and data (e.g., the examples used to train the model) provided for a neural network model and transforms the model into a format that can be accelerated on the neural network accelerator 180, which will be described in further detail below. Specifically, the compiler 132 transforms the source code into executable code, metadata, configuration data, and/or data structures for representing the neural network model and memory as neural network data 200. In some examples, the compiler 132 can divide the neural network model into portions (e.g., neural network 200) using the CPU 120 and/or the GPU 122) and other portions (e.g., a subgraph, an individual layer, or a plurality of layers of a neural network) that can be executed on the neural network accelerator 180. The compiler 132 can generate executable code (e.g., runtime modules) for executing NNs assigned to the CPU 120 and for communicating with a subgraph, an individual layer, or a plurality of layers of a neural network assigned to the accelerator 180. The compiler 132 can generate configuration data for the accelerator 180 that is used to configure accelerator resources to evaluate the subgraphs assigned to the optional accelerator 180. The compiler 132 can create data structures for storing values generated by the neural network model during execution and/or training and for communication between the CPU 120 and the accelerator 180. The compiler 132 can generate metadata that can be used to identify subgraphs, edge groupings, training data, and various other information about the neural network model during runtime. For example, the metadata can include information for interfacing between the different subgraphs or other portions of the neural network model.

The runtime environment 133 provides an executable environment or an interpreter that can be used to train the neural network model during a training mode and that can be used to evaluate the neural network model in training, inference, or classification modes. During the inference mode, input data can be applied to the neural network model inputs and the input data can be classified in accordance with the training of the neural network model. The input data can be archived data or real-time data.

The runtime environment 133 can include a deployment tool that, during a deployment mode, can be used to deploy or install all or a portion of the neural network to neural network accelerator 180. The runtime environment 133 can further include a scheduler that manages the execution of the different runtime modules and the communication between the runtime modules and the neural network accelerator 180. Thus, the runtime environment 133 can be used to control the flow of data between nodes modeled on the neural network module 130 and the neural network accelerator 180.

In one example, the neural network accelerator 180 receives and returns normal-precision values 150 from the neural network module 130. As illustrated in FIG. 1, the quantization accelerator 186 can perform a bulk of its operations using quantized floating-point and an interface between the quantization accelerator 186 and the neural network module 130 can use full-precision values for communicating information between the modules. The normal-precision values can be represented in 16-, 32-, 64-bit, or other suitable floating-point format. For example, a portion of values representing the neural network can be received, including edge weights, activation values, or other suitable parameters for quantization. The normal-precision values 150 are provided to a normal-precision floating-point to quantized floating-point converter 152, which converts the normal-precision value into quantized values. Quantized floating-point operations 154 can then be performed on the quantized values. The quantized values can then be converted back to a normal-floating-point format using a quantized floating-point to normal-floating-point converter 156 which produces normal-precision floating-point values. As a specific example, the quantization accelerator 186 can be used to accelerate a given layer of a neural network, and the vector-vector, matrix-vector, matrix-matrix, and convolution operations can be performed using quantized floating-point operations and less compute-intensive operations (such as adding a bias value or calculating an activation function) can be performed using normal floating-point precision operations.

The conversions between normal floating-point and quantized floating-point performed by the converters 152 and 156 are typically performed on sets of numbers represented as vectors or multi-dimensional matrices. In some examples, additional normal-precision operations 158, including operations that may be desirable in particular neural network implementations can be performed based on normal-precision formats including adding a bias to one or more nodes of a neural network, applying a hyperbolic tangent function or other such sigmoid function, or rectification functions (e.g., ReLU operations) to normal-precision values that are converted back from the quantized floating-point format.

In some examples, the quantized values are used and stored only in the logic gates and internal memories of the neural network accelerator 180, and the memory 125 and storage 129 store only normal floating-point values. For example, the neural network accelerator 180 can quantize the inputs, weights, and activations for a neural network model that are received from the neural network module 130 and can de-quantize the results of the operations that are performed on the neural network accelerator 180 before passing the values back to the neural network model 130. Values can be passed between the neural network model 130 and the neural network accelerator 180 using the memory 125, the storage 129, or an input/output interface (not shown). In other examples, an emulator provides full emulation of the quantization, including only storing one copy of the shared exponent and operating with reduced mantissa widths. Some results may differ over versions where the underlying operations are performed in normal floating-point. For example, certain examples can check for underflow or overflow conditions for a limited, quantized bit width (e.g., 3-, 4-, or 5-bit wide mantissas).

The bulk of the computational cost of DNNs is in vector-vector, matrix-vector, and matrix-matrix multiplications and/or convolutions. These operations are quadratic in input sizes while operations such as bias add and activation functions are linear in input size. Thus, in some examples, quantization is only applied to matrix-vector multiplication operations, which is implemented on the neural network accelerator 180. In such examples, all other operations are done in a normal-precision format, such as float16. Thus, from the user or programmer's perspective, the quantization-enabled system 110 accepts and outputs normal-precision float16 values from/to the neural network module 130 and output float16 format values. All conversions to and from block floating-point format can be hidden from the programmer or user. In some examples, the programmer or user may specify certain parameters for quantization operations. In other examples, quantization operations can take advantage of block floating-point format to reduce computation complexity, as discussed below regarding FIG. 3.

The neural network accelerator 180 is used to accelerate evaluation and/or training of a neural network graph or subgraphs, typically with increased speed and reduced latency that is not realized when evaluating the subgraph using only the CPU 120 and/or the GPU 122. In the illustrated example, the accelerator includes a Tensor Processing Unit (TPU) 182, reconfigurable logic devices 184 (e.g., contained in one or more FPGAs or a programmable circuit fabric), and/or a quantization accelerator 186, however any suitable hardware accelerator can be used that models neural networks. The accelerator 180 can include configuration logic which provides a soft CPU. The soft CPU supervises operation of the accelerated graph or sub-graph on the accelerator 180 and can manage communications with the neural network module 130. The soft CPU can also be used to configure logic and to control loading and storing of data from RAM on the accelerator, for example in block RAM within an FPGA.

In some examples, parameters of the neural network accelerator 180 can be programmable. The neural network accelerator 180 can be used to prototype training, inference, or classification of all or a portion of the neural network model 200. For example, quantization parameters can be selected based on accuracy or performance results obtained by prototyping the network within neural network accelerator 180. After a desired set of quantization parameters is selected, a quantized model can be programmed into the accelerator 180 for performing further operations.

The compiler 132 and the runtime 133 provide a fast interface between the neural network module 130 and the neural network accelerator 180. In effect, the user of the neural network model may be unaware that a portion of the model is being accelerated on the provided accelerator. For example, node values are typically propagated in a model by writing tensor values to a data structure including an identifier. The runtime 133 associates subgraph identifiers with the accelerator, and provides logic for translating the message to the accelerator, transparently writing values for weights, biases, and/or tensors to the neural network accelerator 180 without program intervention. Similarly, values that are output by the neural network accelerator 180 may be transparently sent back to the neural network module 130 with a message including an identifier of a receiving node at the server and a payload that includes values such as weights, biases, and/or tensors that are sent back to the overall neural network model.

FIG. 2 illustrates a simplified topology of a deep neural network (DNN) 200 that can be used to perform enhanced image processing using disclosed BFP implementations. One or more processing layers can be implemented using disclosed techniques for quantized and BFP matrix/vector operations, including the use of one or more of a plurality of neural network quantization accelerators 186 in the quantization-enabled system 110 described above. It should be noted that applications of the neural network implementations disclosed herein are not limited to DNNs but can also be used with other types of neural networks, such as convolutional neural networks (CNNs), including implementations having Long Short Term Memory (LSTMs) or gated recurrent units (GRUs), or other suitable artificial neural networks that can be adapted to use BFP methods and apparatus disclosed herein.

The DNN 200 can operate in at least two different modes. Initially, the DNN 200 can be trained in a training mode and then used as a classifier in an inference mode. During the training mode, a set of training data can be applied to inputs of the DNN 200 and various parameters of the DNN 200 can be adjusted so that at the completion of training, the DNN 200 can be used as a classifier. Training includes performing forward propagation of the training input data, calculating a loss (e.g., determining a difference between an output of the DNN and the expected outputs of the DNN), and performing backward propagation through the DNN to adjust parameters (e.g., weights and biases) of the DNN 200. When an architecture of the DNN 200 is appropriate for classifying the training data, the parameters of the DNN 200 will converge and the training can complete. After training, the DNN 200 can be used in the inference mode. Specifically, training or non-training data can be applied to the inputs of the DNN 200 and forward propagated through the DNN 200 so that the input data can be classified by the DNN 200.

As shown in FIG. 2, a first set 210 of nodes (including nodes 215 and 216) form an input layer. Each node of the set 210 is connected to each node in a first hidden layer formed from a second set 220 of nodes (including nodes 225 and 226). A second hidden layer is formed from a third set 230 of nodes, including node 235. An output layer is formed from a fourth set 240 of nodes (including node 245). In example 200, the nodes of a given layer are fully interconnected to the nodes of its neighboring layer(s). In other words, a layer can include nodes that have common inputs with the other nodes of the layer and/or provide outputs to common destinations of the other nodes of the layer. In other examples, a layer can include nodes that have a subset of common inputs with the other nodes of the layer and/or provide outputs to a subset of common destinations of the other nodes of the layer.

During forward propagation, each of the nodes produces an output by applying a weight to each input generated from the preceding node and collecting the weights to produce an output value. In some examples, each individual node can have an activation function (G) and/or a bias (b) applied. Generally, an appropriately programmed processor or FPGA can be configured to implement the nodes in the depicted neural network 200. In some example neural networks, an output function $f(n)$ of a hidden combinational node n can produce an output expressed mathematically as:

$$f(n) = \sigma\left(\sum_{i=0 \text{ to } E-1} w_i x_i + b\right) \qquad \text{(Eq. 2)}$$

where $w_i$ is a weight that is applied (multiplied) to an input edge $x_i$, b is a bias value for the node n, $\sigma$ is the activation function of the node n, and E is the number of input edges of the node n. In some examples, the activation function produces a continuous value (represented as a floating-point number) between 0 and 1. In some examples, the activation function produces a binary 1 or 0 value, depending on whether the summation is above or below a threshold.

A given neural network can include thousands of individual nodes and so performing all of the calculations for the nodes in normal-precision floating-point can be computationally expensive. An implementation for a more computationally expensive solution can include hardware that is larger and consumes more energy than an implementation for a less computationally expensive solution. However, performing the operations using quantized floating-point can potentially reduce the computational complexity of the neural network. A simple implementation that uses only quantized floating-point may significantly reduce the computational complexity, but the implementation may have difficulty converging during training and/or correctly classifying input data because of errors introduced by the quantization. However, quantized floating-point implementations disclosed herein can potentially increase an accuracy of some calculations while also providing the benefits of reduced complexity associated with quantized floating-point.

The DNN 200 can include nodes that perform operations in quantized floating-point. As a specific example, an output function $f(n)$ of a hidden combinational node n can produce an output expressed mathematically as:

$$f(n) = \sigma\left(Q^{-1}\left(\sum_{i=0 \text{ to } E-1} Q(w_i)Q(x_i)\right) + b\right) \qquad \text{(Eq. 3)}$$

where $w_i$ is a weight that is applied (multiplied) to an input edge $x_i$, $Q(w_i)$ is the quantized floating-point value of the weight, $Q(x_i)$ is the quantized floating-point value of the input sourced from the input edge $x_i$, $Q^{-1}( )$ is the de-quantized representation of the quantized floating-point value of the dot product of the vectors w and x, b is a bias value for the node n, $\sigma$ is the activation function of the node n, and E is the number of input edges of the node n. The computational complexity can potentially be reduced (as compared with using only normal-precision floating-point values) by performing the dot product using quantized floating-point values, and the accuracy of the output function can potentially be increased by (as compared with using only quantized floating-point values) by the other operations of the output function using normal-precision floating-point values.

Neural networks can be trained and retrained by adjusting constituent values of the output function $f(n)$. For example, by adjusting weights $w_i$ or bias values b for a node, the behavior of the neural network is adjusted by corresponding changes in the networks output tensor values. For example, a cost function C(w, b) can be used during back propagation to find suitable weights and biases for the network, where the cost function can be described mathematically as:

$$C(w, b) = \frac{1}{2n}\sum_{x} \|y(x) - a\|^2 \qquad \text{(Eq. 3)}$$

where w and b represent all weights and biases, n is the number of training inputs, a is a vector of output values from the network for an input vector of training inputs x. By adjusting the network weights and biases, the cost function C can be driven to a goal value (e.g., to zero (0)) using various search techniques, for examples, stochastic gradient descent. The neural network is said to converge when the cost function C is driven to the goal value. Similar to the output function $f(n)$, the cost function can be implemented using quantized-precision computer arithmetic. For example, the vector operations can be performed using quantized floating-point values and operations, and the non-vector operations can be performed using normal-precision floating-point values.

As will be discussed in further detail below, the various parameters of the DNN 200 can be adjusted during training. For example, aspects of number formats used to represent node weights, gradients, and activation values can be adjusted at different points during training. For example, early in the training the number of mantissa bits used to represent values in normal precision floating-point or block floating-point formats can be initially low. As training proceeds and entropy of the DNN 200 increases, the number of mantissa bits can be increased. In some examples, block floating-point formats are used early in the training and normal precision floating-point formats are used later in the training. Other parameters that can be adjusted include but are not limited to a number of layers of the neural network, a number of nodes of the neural network, or a number of edges (in other words, number of non-zero edges) in the neural network being trained.

Examples of suitable applications for such neural network BFP implementations include, but are not limited to: performing image recognition, performing speech recognition, classifying images, translating speech to text and/or to other languages, facial or other biometric recognition, natural language processing, automated language translation, query processing in search engines, automatic content selection, analyzing email and other electronic documents, relationship management, biomedical informatics, identifying candidate biomolecules, providing recommendations, or other classification and artificial intelligence tasks.

A network accelerator (such as the network accelerator 180 in FIG. 1) can be used to accelerate the computations of the DNN 200. As one example, the DNN 200 can be partitioned into different subgraphs or network layers that can be individually accelerated. As a specific example, each of the layers 210, 220, 230, and 240 can be a subgraph or layer that is accelerated, with the same or with different accelerators. The computationally expensive calculations of the layer can be performed using quantized floating-point and the less expensive calculations of the layer can be performed using normal-precision floating-point. Values can be passed from one layer to another layer using normal-precision floating-point. By accelerating a group of computations for all nodes within a layer, some of the computations can be reused and the computations performed by the layer can be reduced compared to accelerating individual nodes.

In some examples, a set of parallel multiply-accumulate (MAC) units in each convolutional layer can be used to speed up the computation. Also, parallel multiplier units can be used in the fully-connected and dense-matrix multiplication stages. A parallel set of classifiers can also be used. Such parallelization methods have the potential to speed up the computation even further at the cost of added control complexity.

As will be readily understood to one of ordinary skill in the art having the benefit of the present disclosure, the application of neural network implementations can be used for different aspects of using neural networks, whether alone or in combination or subcombination with one another. For example, disclosed implementations can be used to implement neural network training via gradient descent and/or back propagation operations for a neural network. Further, disclosed implementations can be used for evaluation of neural networks.

IV. Example Quantized Block Floating-Point Formats

Figure 3:
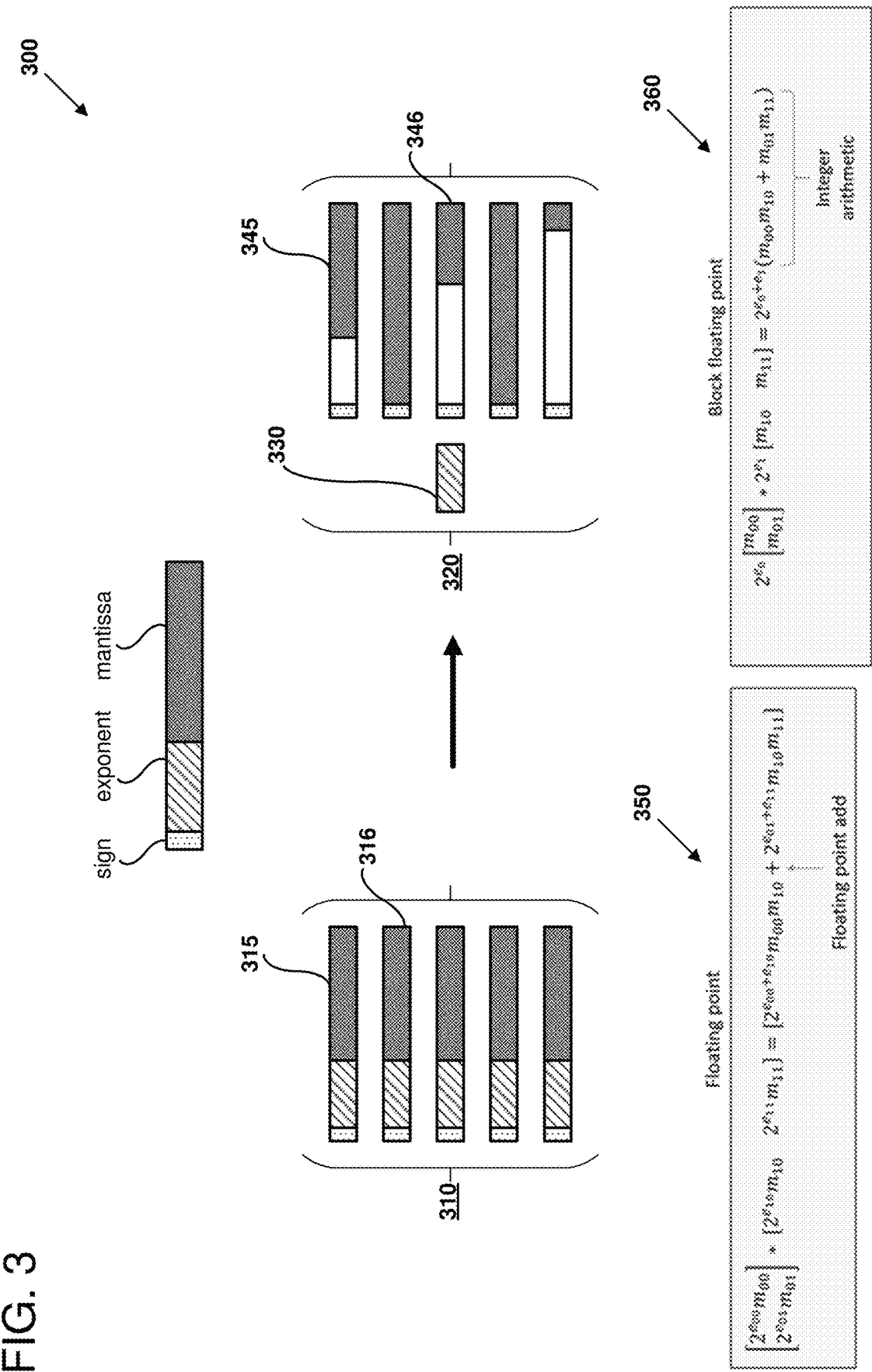
FIG. 3 is a diagram depicting certain aspects of converting a normal floating-point format to a quantized floating-point format, as can be performed in certain examples of the disclosed technology.

FIG. 3 is a diagram 300 illustrating an example of converting a normal floating-point format to a quantized, block floating-point format, as can be used in certain examples of the disclosed technology. For example, input tensors for a neural network represented as normal floating-point numbers (for example, in a 32-bit or 16-bit floating-point format) can be converted to the illustrated block floating-point format.

As shown, a number of normal-precision floating-point format numbers 310 are represented such that each number for example number 315 or number 316 include a sign, an exponent, and a mantissa. For example, for IEEE 754 half precision floating-point format, the sign is represented using one bit, the exponent is represented using 5 bits, and the mantissa is represented using 10 bits. When the floating-point format numbers 310 in the neural network model 200 are converted to a set of quantized precision, block floating-point format numbers, there is one exponent value that is shared by all of the numbers of the illustrated set. Thus, as shown, the set of block floating-point numbers 320 are represented by a single exponent value 330, while each of the set of numbers includes a sign and a mantissa. However, since the illustrated set of numbers have different exponent values in the floating-point format, each number's respective mantissa may be shifted such that the same or a proximate number is represented in the quantized format (e.g., shifted mantissas 345 and 346).

Further, as shown in FIG. 3, use of block floating-point format can reduce computational resources required for certain common operations. In the illustrated example, a dot product of two floating-point vectors is illustrated in formal floating-point format (350) and in block floating-point format (360). For numbers represented in the normal-precision floating-point format operation 350, a floating-point addition is required to perform the dot product operation. In a dot product of floating-point vectors, the summation is performed in floating-point which can require shifts to align values with different exponents. On the other hand, for the block floating-point dot product operation 360, the product can be calculated using integer arithmetic to combine mantissa elements as shown. In other words, since the exponent portion can be factored in the block floating-point representation, multiplication and addition of the mantissas can be done entirely with fixed point or integer representations. As a result, large dynamic range for the set of numbers can be maintained with the shared exponent while reducing computational costs by using more integer arithmetic, instead of floating-point arithmetic. In some examples, operations performed by the quantization-enabled system 110 can be optimized to take advantage of block floating-point format.

In some examples, the shared exponent 330 is selected to be the largest exponent from among the original normal-precision numbers in the neural network model 200. In other examples, the shared exponent may be selected in a different manner, for example, by selecting an exponent that is a mean or median of the normal floating-point exponents, or by selecting an exponent to maximize dynamic range of values stored in the mantissas when their numbers are converted to the quantized number format. It should be noted that some bits of the quantized mantissas may be lost if the shared exponent and the value's original floating-point exponent are not the same. This occurs because the mantissa is shifted to correspond to the new, shared exponent.

There are several possible choices for which values in a block floating-point tensor will share an exponent. The simplest choice is for an entire matrix or vector to share an exponent. However, sharing an exponent over a finer granularity can reduce errors because it increases the likelihood of BFP numbers using a shared exponent that is closer to their original normal floating-point format exponent. Thus, loss of precision due to dropping mantissa bits (when shifting the mantissa to correspond to a shared exponent) can be reduced.

For example, consider multiplying a row-vector x by matrix W: y=xW. If an exponent is shared for each column of W, then each dot-product $xW_j$ (where $W_j$ is the j-th column of W) only involves one shared exponent for x and one shared exponent for $W_j$.

Figure 5:
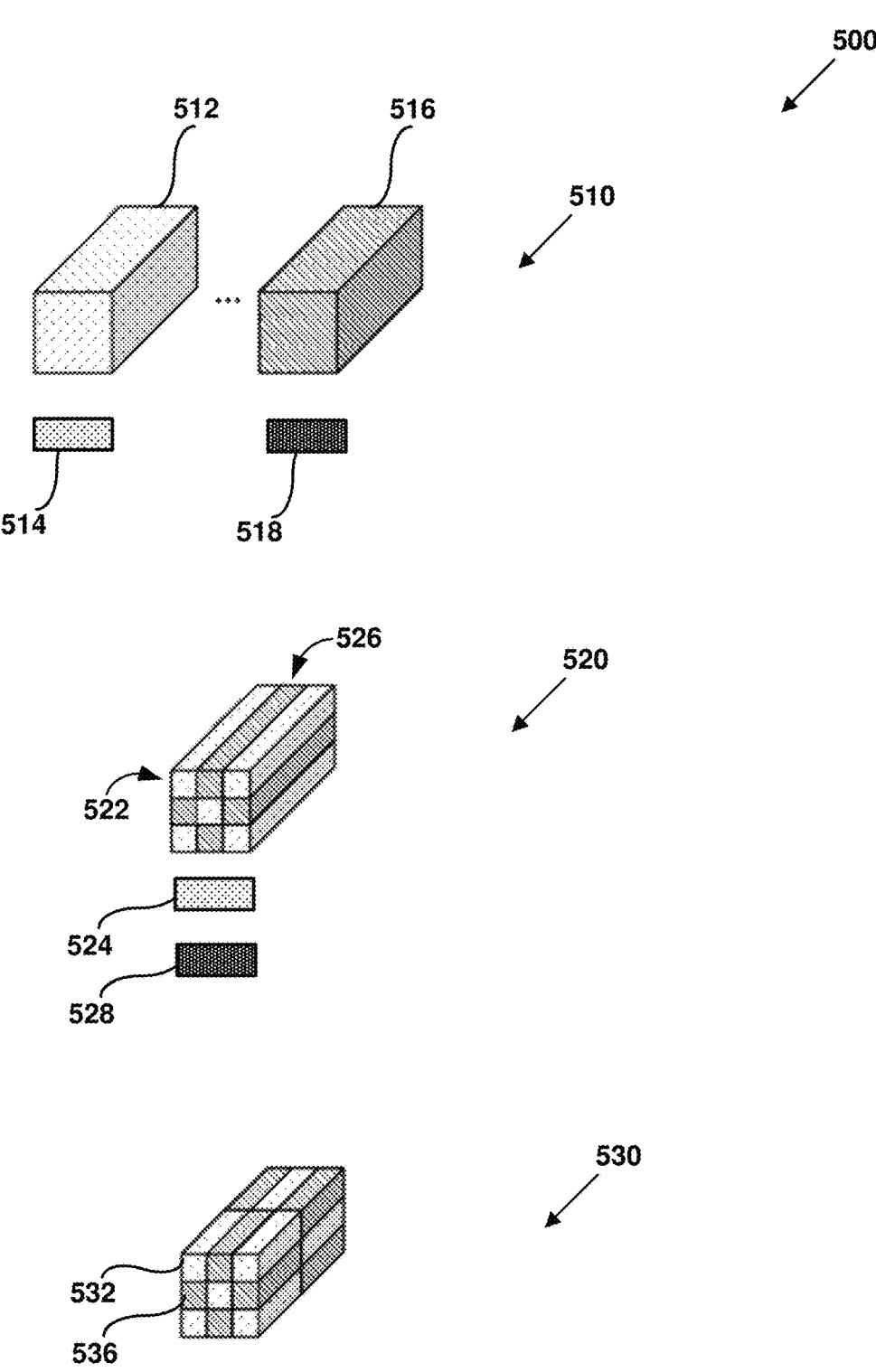
FIG. 5 depicts a number of example block floating-point formats that can be used to represent quantized neural network models, as can be used in certain examples of the disclosed technology.

FIGS. 4 and 5 illustrate alternative block floating-point formats that can be used for computation of neural networks. In the context of neural nets, a core operation is to perform a dot product. For example, dot products are the core computation of matrix multiplication and convolutions. Matrix multiplication involves dot products of the rows/columns of the matrix with an input vector. Convolutions involve dot products of filters with windows of the input. In the context of quantized floating-point, the group of values selected to share an exponent can have an impact on the complexity of the computer arithmetic logic used for calculating the dot product. The values sharing an exponent can be referred to as the values within a bounding box. The shape of bounding boxes can potentially impact quantization error and computation cost. While clustering similar magnitude values to create bounding boxes can reduce quantization error, tracking scaling factors for arbitrary bounding box shapes may be expensive. Instead, matrices and filters can be partitioned into bounding boxes that are potentially more efficient for the operations performed by a neural network. Specifically, an appropriate selection of the bounding box can reduce the complexity of computer arithmetic circuits that are used to implement the operations of the neural network. FIG. 4 illustrates block floating-point formats that may be well suited for matrices and FIG. 5 illustrates block floating-point formats that may be well suited for convolution filters.

FIG. 4 is a diagram 400 illustrating four alternative block floating-point formats, as can be used in certain examples of the disclosed technology. As shown, a first format 410 represents an entire array 420 of values that share a single exponent 425. In other words, the entire array 420 of values is encapsulated within a single bounding box.

In a second format 430, a common exponent is shared on a per-column basis. In other words, the columns of the matrix are the bounding box for the values. Thus, in this particular example, block floating-point values stored in even columns 431 of a matrix each share a first, single exponent 432. Block floating-point values stored in odd columns 435 each share a second, single exponent 437. In other examples, each column of an array can be associated with a different shared exponent. For an eleven-column tile in the alternative format, there can be eleven corresponding shared exponents, one shared exponent per column. In other examples, each row of an array can be associated with a different shared exponent, or odd and even rows can be associated with a shared common exponent.

A third format 450 is shown where groups of elements in an array share a common exponent. For example, if a 15×15 matrix of values shares in exponent according to the third format 450, a first set of 5×5 element groups 455 and 456 share a single shared exponent 458. Similarly, a second 5×5 element group of elements in the array 460 and 461 can each shared a second single exponent 468. In other examples, each of the tiles can be associated with its own respective shared exponent. In the example format 450, there could be nine shared exponents for the 15×15 matrix.

A fourth format 470 is shown where two shared exponents are shared on a tiling plus per-column basis. Thus, a first set of numbers including numbers 480, 481, and 485 all share a single common exponent 488. Similarly, a second set of numbers including a set 490 and 491 each share a second, different single exponent 495. In an alternative example, each of the groups shown can have its own shared exponent.

In some examples, the computational cost of matrix-vector multiplication can be further reduced by reducing mantissa widths. A large range of values having a shared common exponent can be expressed with only a few bits of mantissa. for example, in a representation with 4 bits of mantissa and a 5-bit exponent, values can be expressed in a range $[2^{-14}0.001_2, 2^{15}1.111_2]$, or approximately $[2^{-17}, 2^{16}]$. in contrast, a 4-bit fixed point number can only represent values in the range $[0001_2, 1111_2]$, or approximately $[2^0, 2^4]$.

FIG. 5 is a diagram 500 illustrating three alternative block floating-point formats, as can be used in certain examples of the disclosed technology. These formats may be useful for two-dimensional convolutions, but the formats can be generalized to higher-dimensional convolutions as well. As shown, a first format 510 represents an entire convolution filter 512 of values that share a single exponent 514. A different convolution filter 516 of values can share a single exponent 518. Thus, the format 510 illustrates that an entire convolution filter can be a bounding box of the values.

In a second format 520, each spatial pixel can be a bounding box so that a common exponent is shared on a per-spatial-pixel basis, along the channel dimension. As shown, the spatial pixel values 522 share a single exponent 524 and the spatial pixel values 526 share a single exponent 528. For example, for an input with dimensions $[x, y, c_i]$, each spatial dimension x and y can define a bounding box with $c_i$ values. Similarly, for $c_o$ convolution filters of dimension $[f_x, f_y, c_i]$, each pixel $(f_x, f_y)$ for each of the $c_o$ filters can be a separate bounding box with $c_i$ values. The bounding box size for this approach is $c_i$.

In a third format 530, each spatial pixel can be subdivided along the channel dimension so that a bounding box includes a sub-division of a spatial pixel. As shown, the sub-divided spatial pixel values 532 share a single exponent 534 and the sub-divided spatial pixel values 536 share a single exponent 538. For small $c_i$, the cost of handling the scaling factor can be significant. For example, input images at the first layer of deep convolutional neural nets may have $c_i=3$ corresponding to 3 color channels. Tracking a scaling factor for every triplet can be expensive. In this case, the convolution can be re-shaped into a matrix-matrix multiplication to increase the bounding box and decrease the expense of tracking the bounding box. For example, each convolution filter can be flattened to create a matrix W with $c_o$ columns and $f_x * f_y * c_i$ rows. An input matrix X can be created where each row is a $f_x * f_y * c_i$ vector corresponding to a window of the input that the convolution filter sweeps over. The result Y=XW is a matrix that can be re-shaped to match the output of the convolution operation. With the convolution re-formulated as matrix multiplication, the bounding box strategies discussed above in reference to FIG. 4 for matrix multiplication can be applied.

V. Example Methods of Neural Network Training

FIG. 6 is a flow diagram depicting a method 600 of training a neural network using a quantized model, as can be implemented in certain examples of the disclosed technology. For example, training the neural network can include iterating through a set of training data, where the method 600 is used for updating the parameters of the neural network during a given iteration of training data. As one example, the method 600 can be performed by a quantization-enabled system, such as the quantization-enabled system 110 of FIG. 1.

At process block 610, parameters, such as weights and biases, of the neural network can be initialized. As one example, the weights and biases can be initialized to random block floating-point values in a lower precision format, for example having between two and five bits of precision. In some examples, the weights and biases can be initialized to random floating-point values in a lower precision but normal floating-point format, without exponent sharing. As another example, the weights and biases can be initialized to random normal-precision floating-point values. As another example, the weights and biases can be initialized to normal-precision floating-point values that were calculated from an earlier training set. The initial parameters can be stored in a memory or storage of the quantization-enabled system. In one example, the parameters can be stored as quantized floating-point values which can reduce an amount storage used for storing the initial parameters.

At process block 620, input values of the neural network can be forward propagated through the neural network. Input values of a given layer of the neural network can be an output of another layer of the neural network. The values can be passed between the layers from an output of one layer to an input of the next layer using normal-precision floating-point. The output function of the layer i can include a term that is described mathematically as:

$$y_i = Q^{-1}(f(Q(y_{i-1}), Q(W_i))) \tag{Eq. 4}$$

where $y_{i-1}$ is the output from a layer providing the input to layer i, $W_i$ is the weight tensor for the layer i, $f(\ )$ is a forward function of the layer, $Q(\ ))$ is a quantization function, and $Q^{-1}(\ )$ is a de-quantization function. The output function of the layer can be the de-quantized representation of $f(\ )$ or alternatively, the output function can include additional terms, such as an activation function or the addition of a bias, that are performed using normal-precision floating-point (after de-quantization) or using quantized floating-point (before de-quantization). Generally, the inputs, outputs, and parameters of the layers are tensors. Typically, the inputs, outputs, and parameters of the layers will be vectors or matrices. The quantization function converts normal-precision floating-point values to quantized floating-point values. The quantization function can be selected to account for the type of input data and the types of operations performed by the layer i. For example, when $y_i$ and W are two-dimensional matrices and the output function includes a term that takes the cross product of $y_{i-1}$ and $W_i$ the quantization function for $y_{i-1}$ can use a bounding box including a row or a portion of a row of $y_{i-1}$, and the quantization function for W can use a bounding box including a column or a portion of a column of $W_i$. The computation can be more efficient when selecting the bounding boxes to follow the flow of the operators, thus making a hardware implementation smaller, faster, and more energy efficient. The de-quantization function converts quantized floating-point values to normal-precision floating-point values.

At process block 630, a loss of the neural network can be calculated. For example, the output y of the neural network can be compared to an expected output ŷ of the neural network. A difference between the output and the expected output can be an input to a cost function that is used to update the parameters of the neural network.

At process block 640, back propagation can be performed through the neural network using the calculated loss of the neural network. During back propagation, an output error term ∂y and a weight error term ∂W can be calculated. The output error term can be described mathematically as:

$$\partial y_{i-1} = Q^{-1}(g(Q(a\partial y_i), Q(W_i))) \tag{Eq. 5}$$

where $\partial y_{i-1}$ is the output error term from a layer following layer i, $W_i$ is the weight tensor for the layer i, $g(\ )$ is a backward function of the layer, $Q(\ )$ is a quantization function, and $Q^{-1}(\ )$ is a de-quantization function. The backward function $g(\ )$ can be can be the backward function off $(\ )$ for a gradient with respect to or a portion of the gradient function. The output error term of the layer can be the de-quantized representation of $g(\ )$ or the output error term can include additional terms that are performed using normal-precision floating-point (after de-quantization) or using quantized floating-point (before de-quantization).

The weight error term ∂W can be described mathematically as:

$$\partial W_i = Q^{-1}(h(Q(y_i), Q(\partial y_i))) \tag{Eq. 6}$$

where $\partial w_i$ is the weight error term for the layer i, $\partial y_i$ is the output error term for the layer i, $y_i$ is the output for the layer i, $h(\ )$ is a backward function of the layer, $Q(\ )$ is a quantization function, and $Q^{-1}(\ )$ is a dequantization or up-scale function. The backward function $h(\ )$ can be can be the backward function of $f(\ )$ for a gradient with respect to $W_{i-1}$ or a portion of the weight error equation 6. The weight error term of the layer can be the de-quantized representation of $h(\ )$ or the weight error term can include additional terms that are performed using normal-precision floating-point (after de-quantization) or using quantized floating-point (before de-quantization). The weight error term can include additional terms that are performed using normal-precision floating-point.

Further, node weights for each layer can be updated. For example, the weights for each layer can be updated by calculating new weights based on the iteration of training. As one example, a weight update function can be described mathematically as:

$$W_i = W_i + \eta \times \partial W_i \tag{Eq. 7}$$

where $\partial W_i$ is the weight error term for the layer i, $\eta$ is the learning rate for the layer i for the neural network, $W_i$ is the weight tensor for the layer i. In one example, the weight update function can be performed using normal-precision floating-point.

At process block 650, a performance metric is determined for the neural network. In some examples, the performance metric indicates accuracy of the neural network, for example, based on a set of training data. In some examples, the performance metric is based on at least one of the following metrics: a number of true positives, a number of true negatives, a number of false positives, or a number of false negatives generated by the neural network. In some examples, the performance metric is based on entropy of one or more layers of the neural network. In some examples, the performance metric is based on a rate distortion function.

At process block 660, and adjusted parameter is selected for the neural network based at least in part on the performance metric determined at process block 650. For example, any of the parameters initially selected at process block 610 can be adjusted. For example, numerical precision of number formats used represent values of the neural network can be adjusted. For example, a number of bits used to represent a mantissa can be increased based on the performance metric. As another example, topology of the neural network can be adjusted, for example by adjusting the number of layers or the number of nonzero connections between layers of the neural network.

At process block 670, the neural network is updated based on the adjusted parameter selected at process block 660. For example, topology of the neural network can be adjusted or the precision of number formats used represent values in the neural network can be updated.

After updating the neural network, additional rounds of forward propagation and back propagation can be performed. As training progresses, additional acts of determining performance metrics and adjusting parameters as discussed above can be performed for the neural network.

VI. Example Environment for Performing

Activation Compression Using Narrow Block Floating-Point

Figure 7:
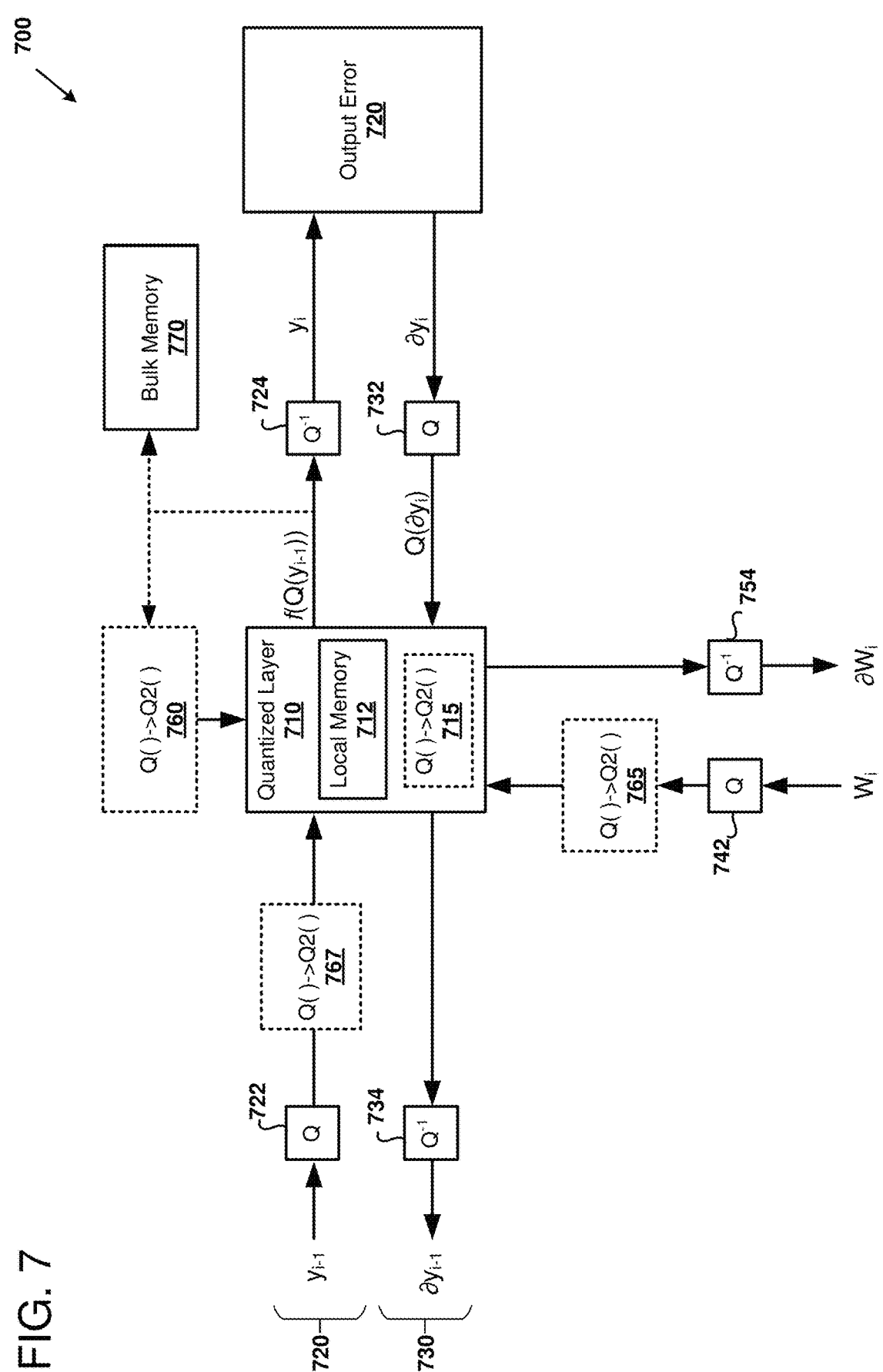
FIG. 7 is a block diagram depicting an example environment for adjusting parameters of a neural network during training, as can be implemented in certain examples of the disclosed technology.

FIG. 7 is a block diagram 700 depicting an example of a suitable environment for performing training and inference operations with a neural network, including determining performance metrics and adjusting parameters of the neural network during training. This includes performing associated floating-point transformation operations between a normal-precision floating-point domains and quantized floating-point domains, or two different format floating points domains (block- or normal-precision). As described above, more computationally expensive operations such as vector-vector, vector-matrix, matrix-matrix, and convolution operations can be performed by the quantized layer 710 in the quantized floating-point domain. Less computationally expensive operations such as scalar add and scalar multiply can be performed outside of the quantized layer 710 in the normal-precision floating-point domain. With regard to neural networks, a neural network can be partitioned into layers (such as the quantized layer 710) in values representing the neural network, such as node weights, activation values, and gradients can be stored in a local memory 712 allocated to the quantized layer. For the back propagation portion of training, an error output component 720 can receive the activation values and use additional functions, such as an error function or an objective function, to calculate the output error term $\partial y_i$. In some examples, the output error terms $\partial y_i$ are calculated in a normal-precision floating-point domain, as shown by the solid lines to the output error component 720. In other examples, the output error component 720 calculates the error output terms in a block floating-point format.

The bulk of the computational work within a layer can be performed in the quantized floating-point domain and less computationally expensive operations of the layer, such as adding a bias value or calculating an activation function, can be performed in the normal-precision floating-point domain. The values that interface between the layers can be passed from one layer to the other layer in the normal-precision floating-point domain. By quantizing the inputs specifically for a given layer, the quantization can be targeted to the operations of that layer so that the operations of the layer are more efficient. Specifically, bounding boxes of the quantized floating-point format can be selected to reduce the complexity of the computer arithmetic circuits to make the computer logic potentially faster and/or more energy efficient.

As one example, the output values $y_i$, the output error term $\partial y_i$, the weights $W_i$, and the weight error terms $\partial w_i$ for a given layer can be stored in the normal-precision floating-point domain. During the forward propagation flow, the output values from an earlier layer can be communicated from the normal-precision floating-point domain to the quantized floating-point domain through the quantizer 722 that converts from normal-precision floating-point to quantized floating-point. The output values from the given layer can be communicated from the quantized floating-point domain to the normal-precision floating-point domain through the de-quantizer 724 that converts from quantized floating-point to normal-precision floating-point. The weights for the given layer can be communicated from the normal-precision floating-point domain to the quantized floating-point domain through the quantizer 742.

Performance metrics can be determined for the neural network at different points during training processes. Based on determine performance metrics, parameters of the neural network or individual layers of the neural network can be adjusted. One adjustment parameter is floating-point format used to represent values for a layer of a neural network. Values can be converted from normal precision floating-point to block floating-point, from normal precision floating-point to a different normal precision floating-point format, or from a first block floating-point format to a second block floating-point format. For example, the number of bits used to represent mantissas can be increased as training progresses. In some examples, transformation from a first quantized format Q( ) a second quantized format Q2( ) is performed with circuitry for the quantized layer 710, such as a processor, reconfigurable logic, or dedicated circuitry that are associated with the quantized layer 710. Such examples, training can be paused and values updated to be represented in the second quantized format.

As will be readily understood to one of ordinary skill in the relevant art having the benefit of the present disclosure, parameters can alternatively be adjusted as values are sent into or read from a quantized layer 710. Example locations of such circuitry are shown in FIG. 7 as circuitry 760, 765, and 767. For example, activation values generated by the quantized layer 710 can be transformed from the first quantized format to the second quantized format and sent back to local memory 712 of the quantized layer 710. As another example, weights received from memory can be quantized from a first format to a second format using the circuitry 765 shown. As another example, weights can be transformed from a first quantized format to a second quantized format as activation values are received from a previous layer of the neural network by circuitry 767.

In other examples, operation of the quantization circuits 722, 724, and/or 742 or the de-quantization circuits 732, 734, and/or 754 that were previously configured to transform data from a normal precision floating-point format to a first block floating-point format can be reconfigured so that values received in the normal precision floating-point format are converted to the second block floating-point format prior to sending to the quantized layer 710.

In such examples, the second block floating-point format typically has a higher precision mantissa than the first block floating-point format used to represent values during quantized layer 710 operations. For example, the first block floating-point format used in the quantized layer 710 may have lower-precision mantissas having two, three, four, five, six, or seven bits; and the second block floating-point format may have mantissas having a higher precision, for example: three, four, or five; four, five or six; five, six or seven; seven or eight; or eight or nine bits, respectively. It should be readily understood to one of ordinary skill in the relevant art having the benefit of the present disclosure that foregoing recited combinations of particular numbers of bits in the first block floating-point format and a second block floating-point format are merely preferred examples, but that other combinations of precision of mantissa format may be used in other examples. In some examples, the second block floating-point format has a higher precision exponent than the first block floating-point format. In some examples, the first block floating-point format uses a sharing format that is different than the sharing format for a common exponent of the second block floating-point format. For example, the sharing format can be different based on per-row, per-column, or per-tile sharing of a common exponent for the compressed activation values. The precision of the second block floating-point format can be adjusted in a number of different ways, including rounding, truncation, and/or shifting of mantissa values.

In some examples, other parameters than numerical precision can be adjusted for the neural network. For example, network topology is a parameter suitable for adjustment. In some examples, adjusting network topology includes at least one of the following: adjusting a number of layers of the trained neural network, adjusting a number nodes of a layer of the trained neural network, or adjusting sparsity of the trained neural network (e.g., by adjusting a number of non-zero edges of a layer of the trained neural network). As discussed further herein, the training performance metric can be used to determine when to adjust parameters of the neural network. Examples of suitable training performance metrics include: accuracy of a neural network, a change in accuracy of a neural network over two or more training epochs, accuracy of at least one layer of a trained neural network, a change in accuracy of at least one layer of a neural network over two or more training epochs, entropy of at least one layer or all of a neural network, or a change in entropy of at least one layer or all of a neural network. By adjusting topology and/or precision parameters of a neural network as training progresses, computation resources are reduced during early training when the solution space for a neural network is large, and gradually reduced as the neural network converges to a solution, and higher precision and/or more detailed topology is provided.

In the illustrated example, the activation values are stored in the bulk memory 770 in a quantized format. In other examples, the values can be de-quantized prior to storing in the bulk memory 770. In some examples, a compressor is provided to further compress activation values prior to storing in the bulk memory by performing at least one or more of the following compression operations: entropy compression, zero compression, run length encoding, compressed sparse row compression, or compressed sparse column compression.

The bulk memory 770 can be implemented using any suitable memory or storage technology. In some examples, memory storing temporary values in the quantization layer 710 is typically implemented as static ram (SRAM), embedded dynamic ram (eDRAM), in a register file, in a block RAM, or other suitable structure, while the bulk memory 770 is typically implemented in memory structures supporting larger, but often slower access, for example off-chip DRAM, network accessible RAM, SSD drives, hard drives, or network-accessible storage. As will be readily understood to one of ordinary skill in the art having the benefit of the present disclosure, the types and arrangement of memory used to implement memory for the quantization layer 710 and the bulk memory 770 can be selected depending on desired performance attributes such as costs, energy, and speed.

If data in the bulk memory 770 are compressed, a decompressor is provided to read the compressed activation values from the bulk memory 770 and reverse the operations performed by the compressor. In examples where additional compression is applied to the quantized values, the values are compressed. The values can then be translated from the second block floating-point format to a normal precision floating-point format.

The output error component 720 can receive activation values in normal precision floating-point format (as in equation 4). In alternative examples, the output error component 720 can receive activation values in a quantized floating-point format (e.g., $f(Q(y_{i-1}))$). The output error component 720 calculates the derivative of the activation value which is used in back propagation. The back propagation is performed using the quantized layer 710 as indicated in the diagram 700.

During the back-propagation flow 730, the output error terms from a later layer can be communicated from the normal-precision floating-point domain to the quantized floating-point domain through the quantizer 732. The output error term from the given layer can be communicated from the quantized floating-point domain to the normal-precision floating-point domain through the de-quantizer 734. The weights for the given layer can be communicated from the normal-precision floating-point domain to the quantized floating-point domain through the quantizer 742. The weight error term error term from the given layer can be communicated from the quantized floating-point domain to the normal-precision floating-point domain through the de-quantizer 754. As back propagation proceeds, quantized activation values in the second block floating-point format are either converted to a normal precision format and translated to the first block floating-point format through the quantizer 732, or alternatively, are converted from the second block floating-point format used to store the activation values in the bulk memory 770 to the first block floating-point format used by the quantized layer 710. Further, in examples where additional compression (e.g., entropy coding, zero encoding, or other additional compression scheme) is applied prior to storing in the bulk memory 770, the data can be further decompressed before the quantizing.

Figure 8:
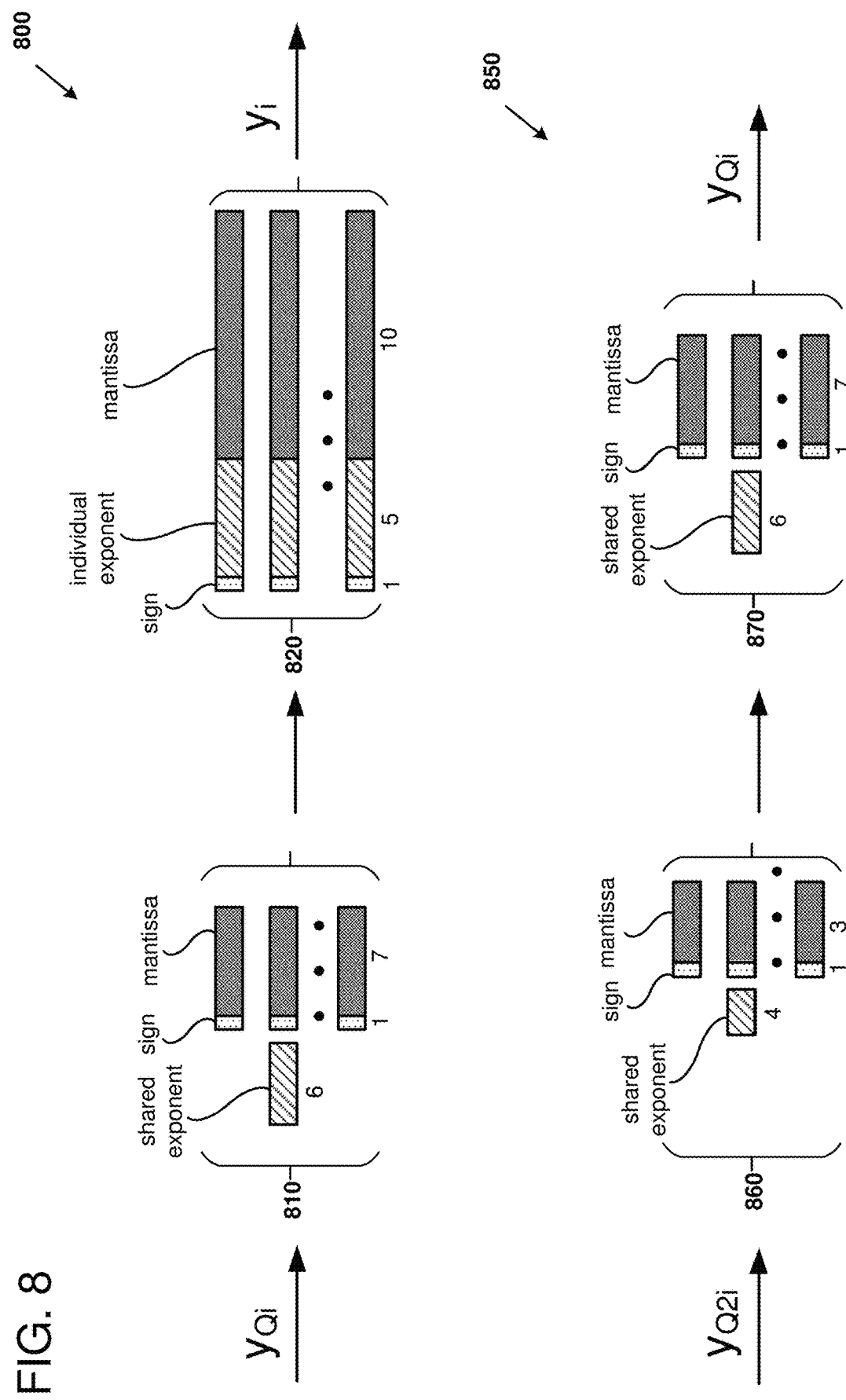
FIG. 8 illustrates examples of transforming from a lower-precision floating-point formats to higher-precision floating-point formats, as can be performed in certain examples of the disclosed technology.

FIG. 8 includes two diagrams 800 and 850 further detailing examples of adjusting parameters for a neural network, and in particular adjusting precision of floating-point formats, as discussed above regarding FIG. 7.

As shown in the first diagram 800, activation values $y_{Qi}$ in a first block floating-point format 810 are received (e.g., from a quantizer 722) and transformed to a second normal-precision floating-point format 820. A de-quantization function is performed to transform the first block floating-point format numbers, which have a one-bit sign, a seven-bit mantissa, and a six-bit shared exponent to activation values $y_i$ in a normal precision floating-point format, which has a 10-bit mantissa, a five-bit individual exponent (in other words, the exponent is not shared between values in the normal precision format), and a one-bit sign bit. In some examples, the shared exponent is not shared by all of a set of values, but can be shared on a per-row, per-column, or per-tile basis.

As shown in the second diagram 850, activation values $y_{Q2i}$ expressed in a second block floating-point format 860 are transformed to activation values $y_{Qi}$ the first block floating-point format. In the illustrated example, the second block floating-point format has values with three-bit mantissas, a four-bit shared exponent, and a one-bit sign. The first block floating-point format 870 is the same as the first block floating-point format 810, although in other examples, different combinations of formats can be used.

As will be readily understood to one of ordinary skill in the relevant art having the benefit of the present disclosure, the illustrated normal-precision and block floating-point formats are not limited to the particular selections of mantissa, exponent, and sign bit with illustrated, and schemes for sharing exponents between values may also be varied, depending on desired aspects of a particular implementation of the compressor. Further, value stored in the bulk memory 770 can be decompressed by reversing the operations shown in the diagram 800.

FIG. 8 includes two diagrams 800 and 850 further detailing examples of adjusting parameters for a neural network, and in particular adjusting precision of floating-point formats, as discussed above regarding FIG. 7.

FIG. 9 includes a diagram 900 detailing an example of adjusting topology parameters for a neural network, as can be performed in certain examples of the disclosed technology. In the illustrated example, training for a neural network 910 in a first format has proceeded. The neural network 910 is shown with four layers numbered 921, 922, 923, and 924. As training proceeds, and entropy of the neural network increases, or other performance metric data indicates that topology of the neural network 910 should be changed, disclosed techniques can be used to change the topology of the neural network 910 to a neural network 940 having four layers, including an input layer 941, two hidden layer is 942 and 943, and an output layer 944. A second format. In the illustrated neural network 940, a number of nodes have been added to hidden layers 942 and 943. As will be readily understood to one of ordinary skill in the relevant art having the benefit of the present disclosure, the example neural networks 910 940 are simplified examples for ease of explanation. Neural networks used in practical examples will typically have a far larger number of nodes and layers, but similar techniques can be used to adjust parameters of the neural network. Other examples of changes to the neural network can include adjusting sparseness of the neural network by adjusting zero weight edges of the neural network, adjusting the number of layers, adjusting the types of nodes of layers, or other suitable changes.

Figure 10:
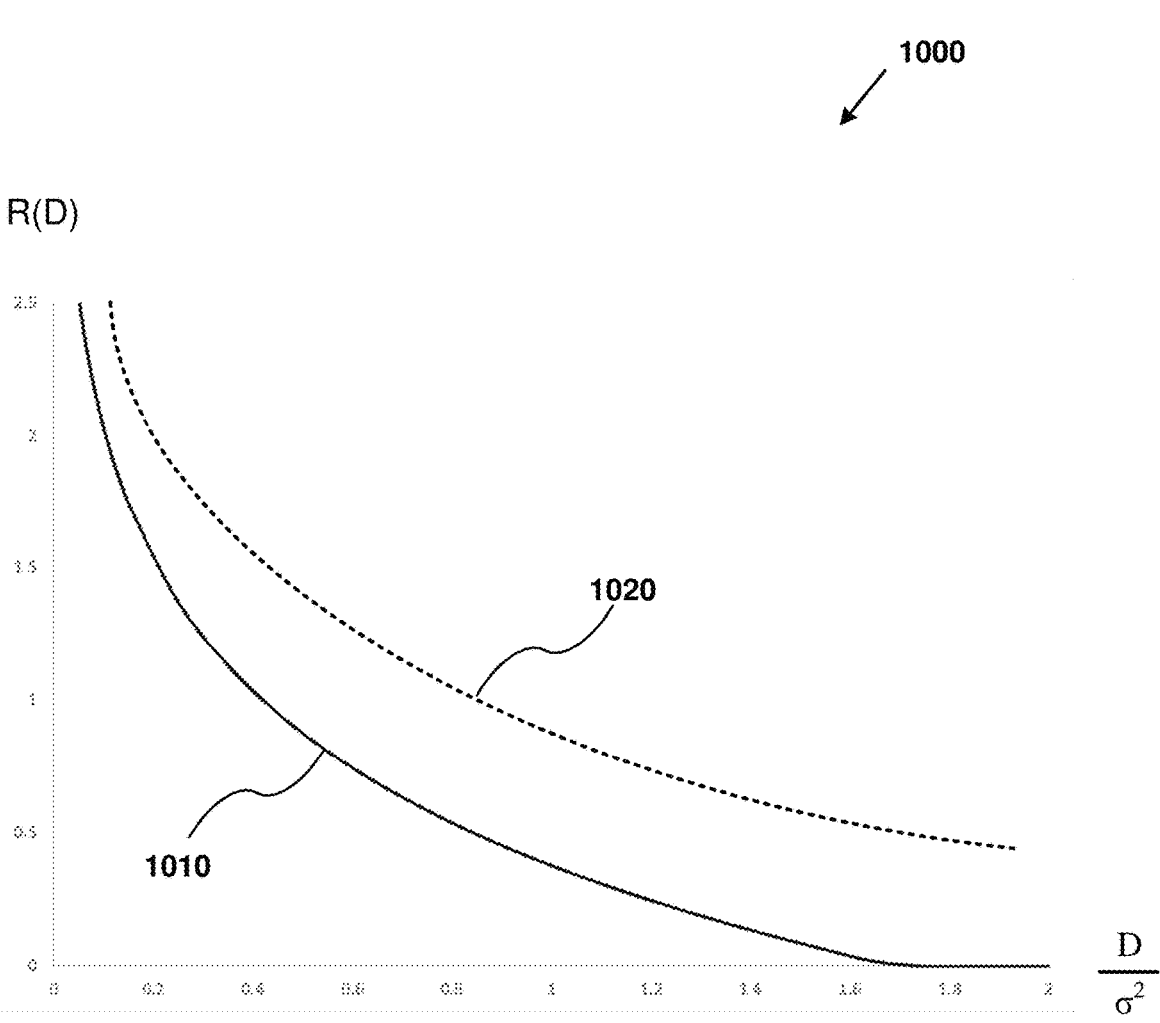
FIG. 10 is a chart illustrating change in a performance metric based on rate distortion theory, as can be used in certain examples of the disclosed technology.

An example of a performance metric that can be used to determine when to adjust parameters of a neural network is entropy. An example of using entropy to calculate a performance metric is illustrated with reference to the chart 1000 of FIG. 10. In the chart 1000, the x-axis is a ratio of a given distortion D to the square of the variance $\sigma^2$ and the y-axis is a rate distortion function R(D). The rate distortion function indicates a minimum number of bits that should be used to represent data for the associated layer of the neural network. An example of a suitable rate distortion function R(D) for a memoryless Gaussian source with squared-error distortion is provided by Equation 10:

$$R(D) = \frac{1}{2}\log_2\left(\frac{\sigma_x^2}{D}\right) \text{ if } 0 \leq D \leq \sigma_x^2 \qquad \text{(Eq. 10)}$$

$$R(D) = 0 \text{ if } D > \sigma_x^2$$

A first solid line 1010 in the chart indicates the frontier where reducing the number of bits will cause information loss according to the Shannon theorem, for data having a particular level of variance. As training progresses, and variance of values in a neural network increase, the frontier will shift, as indicated by a second dotted line 1020 in the chart. Thus, as shown, as variance and hence entropy of the data increases, more bits should be used to represent values of the neural network with sufficient precision.

As will be readily understood to one of ordinary skill in the relevant art having the benefit of the present disclosure, other suitable rate distortion functions, or other performance metrics can be used. For example, functions based on entropy or change in entropy for one or more or all layers of a neural network can be used as the performance metric. In other examples, metrics based on accuracy can be used as performance metric.

Metrics based on accuracy use known results for a set of training data and compares the known results to values achieved when using a neural network undergoing training. Values in a confusion matrix, also termed an error matrix are used to form various accuracy functions. The values generated by the neural network are compared to known results to generate the following conditions: a true positive, where the output of the neural network being trained corresponds to a positive result in the known output, a true negative, where the output of the neural network being trained matches a negative result in the known output, a false positive, where the output of the neural network being trained indicates a positive result, and the corresponding known output indicates a negative result, and a false-negative, where the output of the neural network being trained indicates a negative result, and the corresponding known output indicates a positive result. As a simple example, if the known outputs for image matching of cats or dogs, when the neural network being trained indicates the image the cat but the known output indicates that the image is a dog, this is a false positive. If the neural network being trained indicates the image is not a cat, but the node output indicates that the image is indeed a cat, this is a false negative. Similarly, where both the neural network being trained and the known output indicate that the image is a cat, or the image is not a cat, are considered true positives and true negatives, respectively.

Examples of accuracy metrics that can be generated from these for confusion matrix values include the following:

true positive rate, which is the ratio of true positives to the total number of real positives in the test data, also referred to as sensitivity, recall, or hit rate;

true negative rate, which is the ratio of true negatives to the total number, which may also be referred to as specificity or selectivity;

positive predictive value, which is the ratio of true positives to the sum of all true positives and false positives, which may also be referred to as precision;

negative predictive value, which is the ratio of true negatives to the sum of all true negatives and false negatives, which may also be referred to as negative precision;

false-negative rate, which is the ratio of false negatives to the number of real positives in the data, may also be referred to as miss rate;

false positive rate, which is the ratio of false positives to the total number of real negative cases in the data, which may also be referred to as fall-out;

false discovery rate, which is the ratio of false positives to the sum of all false positives and true positives;

false omission rate, which is a ratio of false negatives to the sum of all false negatives and all true negatives; and accuracy rate, which is the ratio of the sum of all true positives and all true negatives to the sum of all positive cases and all negative cases in the data.

As will be readily understood to one of ordinary skill in the relevant art having the benefit of the present disclosure, other metrics can be used to determine the accuracy and thus used to determine a performance metric for determining when to adjust parameters of the neural network including neural network topology and floating-point precision. Accuracy rates can be compared to predetermined values to determine whether to adjust parameters of the neural network. For example, based on which particular epochs the training processes and, whether the accuracy is improving, or the rate at which the accuracy is improving, a performance metric can indicate whether to adjust parameters of the neural network.

Figure 11:
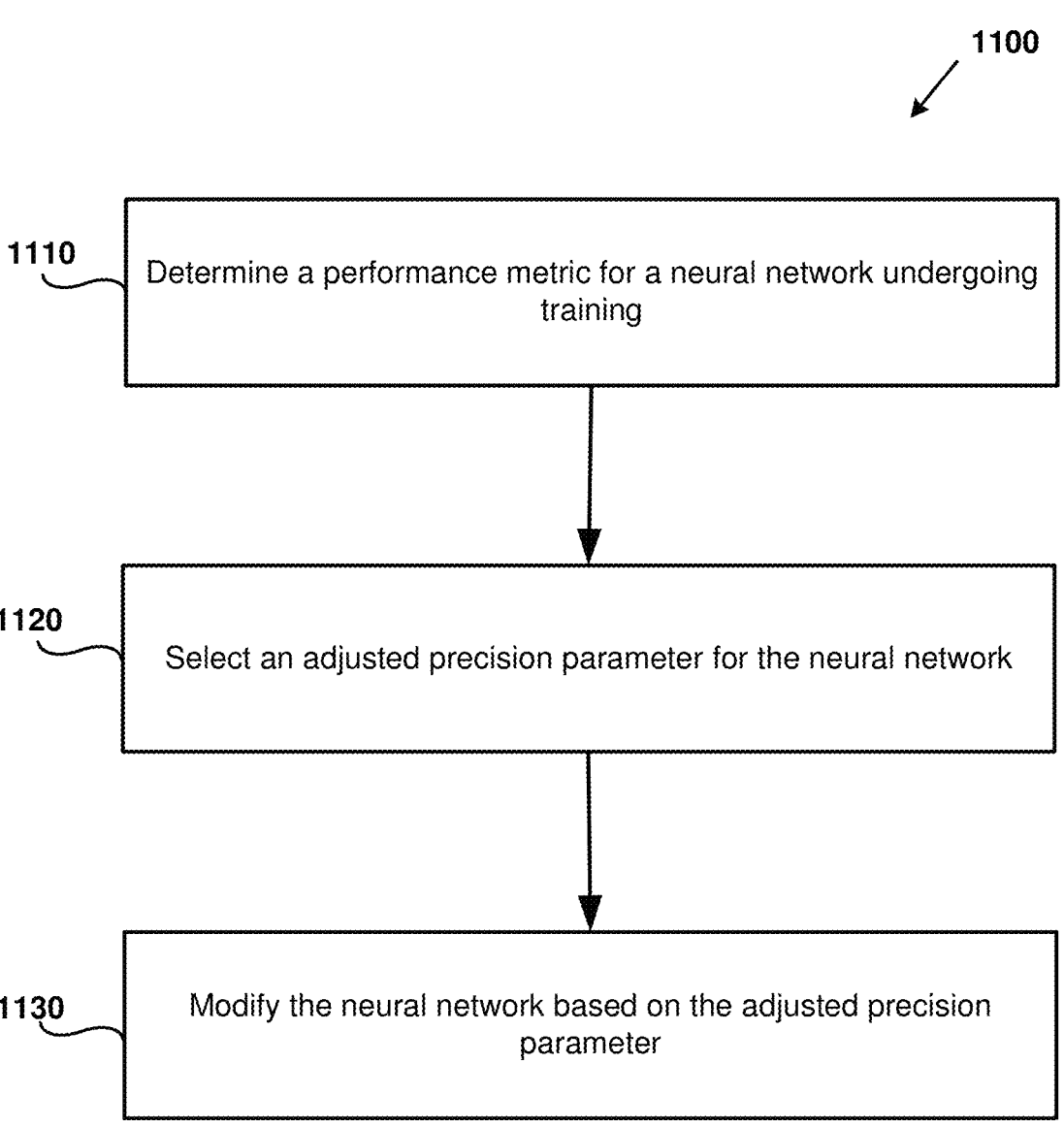
FIG. 11 is a flowchart outlining an example method of adjusting precision parameters for a neural network, as can be performed in certain examples of the disclosed technology.

VII. Example Method of Modifying Neural Network Based on a Performance Metric FIG. 11 is a flowchart 1100 outlining an example method of determining a performance metric, adjusting precision parameters, and modifying a neural network, as can be performed in certain examples of the disclosed technology. For example, the quantization system 110 discussed above regarding FIG. 1 and other associated techniques discussed above can be used to implement certain aspects illustrated in the flowchart 1100.

At process block 1110, a performance metric for a neural network undergoing training is determined. As discussed in further detail above, any suitable performance metric, such as metrics based on entropy, change in entropy, accuracy, change in accuracy, rate distortion theory, and heuristics can be measured to determine the performance metric. When the performance metric indicates that a precision parameter of a neural network should be adjusted, the method proceeds to process block 1120. For example, after a number of training batches have been performed, for a number of training epochs have been performed, performance metrics can be evaluated and a determination made as to whether to adjust the precision parameter of the neural network. Typically, it is desirable to allow for large searching of the neural network solution surface at the beginning of training, and reduce the neural network solution surface by adjusting the neural network precision parameters. For example, a lower precision number format such as a two- or three-bit precision block floating-point format can be used early in training and the precision of numbers used to represent activation values, weights, and/or gradients for the neural network can be increased for successive training operations, as indicated by the performance metric.

At process block 1120, a precision parameter is selected to be adjusted for the neural network. For example, numerical precision can be adjusted, such as increasing the number of bits to represent a mantissa, the number of bits used to represent an exponent, and/or exponent sharing schemes in block floating-point formats. Further, numerical precision can be adjusted by transforming from block floating-point formats to normal precision floating-point formats. As another example, topology parameters for the neural network can be adjusted. As an example, the number of nodes, the number of nonzero edges, the number of layers, the types of nodes in particular layers, or other topology aspects of the neural network can be adjusted as training progresses. One or more different precision parameters can be adjusted at a time. After selecting one or more precision parameters to adjust, the method proceeds to process block 1130.

At process block 1130, the neural network is modified based on the adjusted precision parameter. For example, local or bulk memory storing values for the neural network can be updated to have values in the new floating-point format or the new network topology. In some examples, modification to floating-point formats or network topology is performed as values are transferred as a part of training. For example, values being transferred from a first layer of a neural network to a successive layer of the neural network can be transformed as part of the transfer process.

VIII. Example Method of Performing Training Using Performance Metrics

FIG. 12 is a flowchart 1200 outlining an example method of performing training and adjusting a neural network based on performance metrics, as can be performed in certain examples of the disclosed technology. For example, the quantization system 110 discussed above regarding FIG. 1 and other associated techniques discussed above can be used to implement certain aspects illustrated in the flowchart 1100.

At process block 1210, forward propagation is performed for at least one layer of a neural network propagate activation values for edges of at least one layer of the neural network. Loss and other error of the neural network v. a known training set can be evaluated. These values are used to determine gradients used in back propagation.

At process block 1220, backward propagation is performed after activation values have been forward propagated through the neural network. Gradients are used in order to update node weights of the neural network. Back propagation typically proceeds from the output layer of the neural network to the input layer of the neural network. After backward propagation has been performed, a performance metric can be evaluated for the neural network or for a layer of the neural network. As discussed further above, this performance metric can be based on entropy, accuracy, changes in entropy or accuracy, or other suitable performance metrics. After determining the performance metric, the method can proceed to process block 1230 or to process block 1240. In some examples, operations described for both process blocks 1230 and 1240 are performed, while in other examples, only operations for one of the process blocks are performed.

At process block 1230, a floating-point precision parameter of the neural network is adjusted based on the determined performance metric. The parameters selected to improve the metric in the neural network once the parameter has been adjusted. For example, it is expected that accuracy of the neural network will improved with increased floating-point precision. Similarly, entropy of the neural network is expected to improve with increased floating-point precision.

At process block 1240, a topology parameter of the neural network is adjusted based on the determined performance metric. The topology parameters are selected to improve the performance metric in the neural network once the parameter has been adjusted. For example, it is expected that accuracy of the neural network will improve with increased numbers of nodes and/or reduced sparseness of edges in the neural network. Similarly, entropy of the neural network is expected to increase as more detail is added to the neural network.

At process block 1250, values for the neural network that were adjusted at process blocks 1230 and/or 1240 are stored in memory or storage device. The stored values can be used to perform later training and inference operations as training progresses. The values can be stored in local or bulk memory, as further described above. After updating the adjusted values, the method can proceed back to process block 1210 in order to perform more operations associated with forward propagation and backward propagation, determining performance metrics, and performing further adjustments to the neural networks. After training stops, dies for the neural network can be stored in a memory or storage device. Such neural networks may be deployed in a distributed computing environment for use in inference operations with the trained neural network. Thus, improved methods of training neural networks, which reduce use of connotation resources, energy consumption, reduce memory use, and/or reduce training time, as can be realized in certain examples of the disclosed technology, are disclosed.

IX. Example Computing Environment

Figure 13:
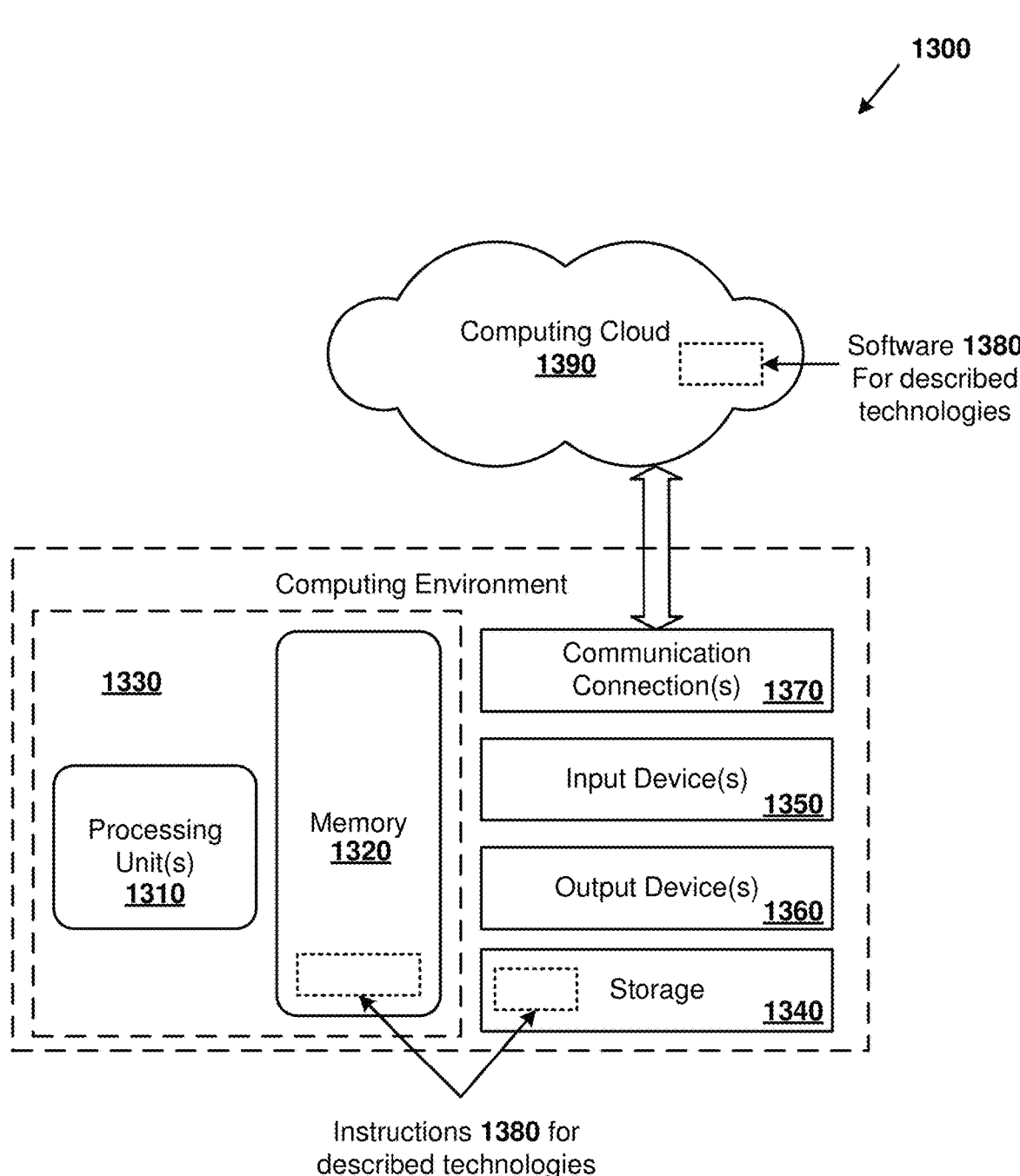
FIG. 13 is a block diagram illustrating a suitable computing environment for implementing some embodiments of the disclosed technology.

FIG. 13 illustrates a generalized example of a suitable computing environment 1300 in which described embodiments, techniques, and technologies, including adjusting neural network parameters during training, can be implemented.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one processing unit 1310 and memory 1320. In FIG. 13, this most basic configuration 1330 is included within a dashed line. The processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), nonvolatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, the disclosed methods can be executed on processing units 1310 located in the computing environment 1330, or the disclosed methods can be executed on servers located in the computing cloud 1390.

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

X. Additional Examples of the Disclosed Technology

Additional examples of the disclosed subject matter are discussed herein in accordance with the examples discussed above. For example, the quantization-enabled system 110 discussed above along with various techniques disclosed for producing and using outlier values can be used in accordance with the specific examples and aspects of the disclosed technology discussed below.

A system of one or more computers can be configured to perform particular disclosed neural network operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In some examples of the disclosed technology, a computing system includes one or more processors, and memory. The computing system is configured to, with the one or more processors, perform forward propagation for at least one layer of a neural network to propagate activation values for edges of the at least one layer, with at least one of the processors, perform backward propagation for at least one layer of a neural network to propagate gradients for nodes of the at least one layer, with at least one of the processors, adjust a parameter of the neural network, and update activation values and/or weights for the neural network based on the adjusted parameter to produce the neural network having the adjusted parameter. In some examples, the computing system measures a training performance metric for the trained neural network, and the adjusting the parameter is based on the training performance metric. In some examples, the parameter is adjusted according to a predetermined schedule. For example, the parameter can be adjusted using a dynamic regularization term or for a predetermined number of training epochs. In some examples, the computing system is further configured to, after adjusting the parameter of the neural network: perform forward propagation for the at least one layer of the neural network having the adjusted parameter to propagate activation values for edges of the at least one layer, producing updated activation values, perform backward propagation for at least one layer of the neural network having the adjusted parameter to propagate gradients for nodes of the at least one layer, producing updated weights, and store the updated activation values and/or the updated weights in the memory. In some examples, the activation values and the weights are stored in a block floating-point format. In some examples, the activation values and the weights are stored in a block floating-point format and the adjusted parameter includes at least increasing a number of mantissa bits of the block floating-point format, increasing a number of exponent bits of the block floating-point format, or changing a sharing parameter of a shared exponent. In some examples, the computing system is configured to update the activation values, the gradients, and/or node weights by increasing a number of bits used to stored mantissa values in the activation values the gradients, and/or node weights, respectively, producing updated activation values, updated gradients, and/or updated node weights, and store the updated activation values, updated gradients, and/or updated node weights in the memory.

In some examples, the computing system determines the performance metric by: determining differences between an output of a layer of the neural network from an expected output, and based on the determining, adjusting the parameter by increasing a number of mantissa bits used to store the updated activation values, updated gradients, and/or updated node weights in the neural network having the adjusted parameter. In some examples, the computing system is further configured to store values for the neural network having the adjusted parameter in a computer-readable storage device or media, the values including at least one of: updated activation values, updated gradients, or updated node weights generated after the adjusting the parameter. In some examples, the performance metric is based on at least one of the following for a layer of the neural network: number of true positives, number of true negatives, number of false positives, or number of false negatives.

In some examples of the disclosed technology, a method of operating a computing system implementing a neural network, includes, with a computing system: training at least one layer of the neural network by forward propagating and backward propagating activation or gradient values, respectively, for a number of training epochs and adjusting a precision parameter of the neural network and updating the neural network for the adjusted precision parameter to produce an updated, trained neural network. In some examples, the computing system is a quantization-enabled computing system. In some examples, the method further includes measuring a training performance metric for the trained neural network, wherein the adjusting the precision parameter is based on the training performance metric. In some examples, the precision parameter is adjusted according to a predetermined schedule. For example, the parameter can be adjusted using a dynamic regularization term or for a predetermined number of training epochs. In some examples, the adjusted precision parameter is selected using a rate distortion function.

In some examples of the disclosed technology, the training performance metric comprises at least one of the following: accuracy of the trained neural network, change in accuracy of the trained neural network over two or more of the training epochs, accuracy of at least one layer of the trained neural network, change in accuracy of at least one layer of the trained neural network over two or more training epochs, entropy of at least one layer of the trained neural network, or change in entropy of at least one layer of the trained neural network.

In some examples of the disclosed technology, the training performance metric is based on accuracy or change in accuracy of at least one layer of the trained neural network, and the accuracy or change in accuracy is measured based at least in part on one or more of the following for the at least one layer of the trained neural network: a true positive rate, a true negative rate, a positive predictive rate, a negative predictive value, a false negative rate, a false positive rate, a false discovery rate, a false omission rate, or an accuracy rate.

In some examples of the disclosed technology, the training performance metric is based on one or more of the following: mean square error of at least one layer of the trained neural network, perplexity of at least one layer of the trained neural network, gradient signal to noise ratio of at least one layer of the trained neural network, or entropy of the trained neural network.

In some examples of the disclosed technology, the precision parameter is for a network topology parameter, and wherein the adjusting the precision parameter comprises at least one of the following: adjusting a number of layers of the trained neural network, adjusting a number of nodes of a layer of the trained neural network, adjusting sparsity of edges of a layer of the trained neural network or adjusting a number of non-zero edges of a layer of the trained neural network.

In some examples of the disclosed technology, a method of configuring a computer system to implement a neural network includes implementing a first layer of the neural network using first node weights and/or first activation values expressed in a first floating-point format, forward propagating values from the first layer of the neural network to a second layer of the neural network, determining a training performance metric for the neural network, selecting an adjusted precision parameter for the neural network, and modifying the neural network based on the adjusted precision parameter. In some examples of the method, the first floating point format is a block floating-point format, and the adjusted precision parameter causes the computer system to increase a number of mantissa bits of the first floating point format so that at least some of the activation values and/or weights of the modified neural network are stored in a second floating point format having an increased number of mantissa bits. In some examples, the first floating point format stores at least one value with a mantissa having exactly one, two, three, four, five, or size bits; and the second floating point format stores the at least one value with a mantissa having at least one more bits than the value in the first floating point format. In some examples, the increased number of bits of mantissas in the second floating point format is selected using a rate distortion function. In some examples, the floating-point format is a block floating-point format, and the method further includes, based on the adjusted precision parameter, modifying the neural network to convert values from the first block floating-point format to a normal precision floating point format, and forward propagating the values from the first layer of the neural network to the second layer of the neural network.

In some examples of the disclosed technology, processors used include at least one of the following: a tensor processing unit, a neural network accelerator, a graphics processing unit, or a processor implemented in a reconfigurable logic array.

In some examples of the disclosed technology, computer-readable storage devices or media store computer-executable instructions, which when executed by a computer or processor, cause the computer or processor to perform any one or more disclosed methods of configuring and/or operating a computer system to implement a neural network by adjusting parameters of the neural network.

In some examples, the input tensor can be a two-dimensional matrix. Converting the input tensor from the normal-precision floating-point format to the block floating-point format can include selecting a plurality of elements within a column of the two-dimensional matrix to share a common exponent in the block floating-point format. Converting the input tensor from the normal-precision floating-point format to the block floating-point format can include selecting a plurality of elements within a row of the two-dimensional matrix to share a common exponent in the block floating-point format. The tensor can have any number of dimensions: one, two, three, four, five, or more dimensions, depending on the particular application.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A computing system comprising:
one or more processors;
at least one memory in communication with the one or more processors; and
the computing system being configured to dynamically update a parameter of a neural network during training of the neural network, the training of the neural network comprising:
for each of multiple iterations in an epoch of training of the neural network, in a given iteration of the multiple iterations:
for a first set of one or more training values:
with at least one of the processors, perform forward propagation for at least one layer of a neural network to propagate activation values for edges of the at least one layer using a first parameter value for the parameter of the neural network, wherein the parameter is a precision parameter or a topology parameter;
with at least one of the processors, perform backward propagation for at least one layer of the neural network to propagate gradients for nodes of the at least one layer using the first parameter value;
for the given iteration, with at least one of the processors, determine a performance metric for the neural network, the performance metric being selected from accuracy of the neural network, entropy of the neural network, mean square error of the neural network, perplexity of the neural network, or gradient signal to noise ratio of the neural network;
based on the performance metric determined during the given iteration, dynamically adjust the parameter of the neural network to produce an adjusted parameter, the adjusted parameter being selected to improve the performance metric in a neural network having the adjusted parameter, the performance; and
for a second set of one or more training values in another iteration of the multiple iterations, perform one or more additional propagation operations for the at least one layer of the neural network having the adjusted parameter, the one or more additional propagation operations comprising a propagation operation that updates activation values and/or weights for the neural network using the adjusted parameter.

2. The computing system of claim 1, further configured to, after adjusting the parameter of the neural network:
perform forward propagation for the at least one layer of the neural network having the adjusted parameter to propagate activation values for edges of the at least one layer, producing updated activation values;
perform backward propagation for at least one layer of the neural network having the adjusted parameter to propagate gradients for nodes of the at least one layer, producing updated weights; and
store the updated activation values and/or the updated weights in the at least one memory.

3. The computing system of claim 1, wherein:
the activation values and the weights are stored in a block floating-point format; and
the adjusted parameter comprises at least increasing a number of mantissa bits of the block floating-point format, increasing a number of exponent bits of the block floating-point format, or changing a sharing parameter of a shared exponent.

4. The computing system of claim 1, wherein the computing system is configured to:
update the activation values, the gradients, and/or node weights by increasing a number of bits used to store mantissa values in the activation values the gradients, and/or node weights, respectively, producing updated activation values, updated gradients, and/or updated node weights; and
store the updated activation values, updated gradients, and/or updated node weights in the at least one memory.

5. The computing system of claim 1, wherein the computing system determines the performance metric by:
determining differences between an output of a layer of the neural network from an expected output; and
based on the determining differences, adjusting the parameter by increasing a number of mantissa bits used to store updated activation values, updated gradients, and/or updated node weights in the neural network having the adjusted parameter.

6. The computing system of claim 1, wherein the computing system is further configured to store values for the neural network having the adjusted parameter in a computer-readable storage device or media, the values including at least one of: updated activation values, updated gradients, or updated node weights generated after the adjusting the parameter.

7. The computing system of claim 1, wherein the performance metric is based on at least one of the following for a layer of the neural network: number of true positives, number of true negatives, number of false positives, or number of false negatives.

8. A method of operating a computing system implementing a neural network, the method comprising:

with the computing system, dynamically updating a parameter of the neural network during training of the neural network, the training of the neural network comprising:

for each of multiple iterations in an epoch of training of the neural network, in a given iteration of the multiple iterations:

for a first set of one or more training values, training at least one layer of the neural network by forward propagating and backward propagating activation or gradient values, respectively, for a number of training epochs using a first parameter value for a parameter of the neural network;

determining a performance metric for the neural network during the training of the neural network, the performance metric being selected from accuracy of the neural network, entropy of the neural network, mean square error of the neural network, perplexity of the neural network, or gradient signal to noise ratio of the neural network;

for the given iteration, using the performance metric, dynamically adjusting the parameter of the neural network during the training of the neural network to provide an adjusted parameter of the neural network and updating the neural network using the adjusted parameter to produce an updated neural network; and with the updated neural network and during the training of the neural network, performing additional training for at least one layer of the neural network by forward propagating and backward propagating activation or gradient values, respectively, for at least one additional training epoch using a second set of one or more training values in another iteration of the multiple iterations.

9. The method of claim 8, wherein the parameter is adjusted according to a predetermined schedule.

10. The method of claim 8, wherein the parameter is a precision parameter or a topology parameter.

11. The method of claim 8, wherein the performance metric comprises at least one of the following:

accuracy of the neural network;

change in accuracy of the neural network over two or more of the training epochs;

accuracy of at least one layer of the neural network;

change in accuracy of at least one layer of the neural network over two or more training epochs;

entropy of at least one layer of the neural network; or change in entropy of at least one layer of the neural network.

12. The method of claim 8, wherein the performance metric is based on accuracy or change in accuracy of at least one layer of the neural network, and wherein the accuracy or change in accuracy is measured based at least in part on one or more of the following for the at least one layer of the neural network: a true positive rate, a true negative rate, a positive predictive rate, a negative predictive value, a false negative rate, a false positive rate, a false discovery rate, a false omission rate, or an accuracy rate.

13. The method of claim 8, wherein the performance metric is based on one or more of the following: mean square error of at least one layer of the neural network, perplexity of at least one layer of the neural network, gradient signal to noise ratio of at least one layer of the neural network, or entropy of the neural network.

14. The method of claim 8, wherein the parameter is for a network topology parameter, and wherein the adjusting the precision parameter comprises at least one of the following: adjusting a number of layers of the neural network, adjusting a number of nodes of a layer of the neural network, adjusting sparsity of edges of a layer of the neural network or adjusting a number of non-zero edges of a layer of the neural network.

15. One or more non-transitory computer-readable storage devices or media comprising:

computer-executable instructions that, when executed by a computing system comprising at least one processor and at least one memory coupled to the at least one processor, cause the computer system to implement a first layer of the neural network using first node weights and/or first activation values expressed in a first floating-point format;

computer-executable instructions that, when executed by the computing system, cause the computer system to, during training of the neural network, for a first set of one or more training values, forward propagate values from the first layer of the neural network to a second layer of the neural network using a first value for a parameter of the neural network, wherein the parameter is a precision parameter or a topology parameter, and to perform backward propagation for at least one layer of the neural network using the first parameter value;

computer-executable instructions that, when executed by the computing system, cause the computer system to, for the given iteration, a performance metric for the neural network, the performance metric being selected from accuracy of the neural network, entropy of the neural network, mean square error of the neural network, perplexity of the neural network, or gradient signal to noise ratio of the neural network, determine a training performance metric for the neural network;

computer-executable instructions that, when executed by the computing system, cause the computer system to dynamically adjust the parameter for the neural network based on the performance metric determined for the given iteration to provide an adjusted parameter, the adjusted parameter being selected to improve the performance metric in a neural network having the adjusted parameter; and computer-executable instructions that, when executed by the computing system, cause the computer system to modify the neural network during the training of the neural network based on the adjusted precision parameter;

computer-executable instructions that, when executed by the computing system, cause the computer system to, for a second set of one or more training values in another iteration of the training, perform additional forward and backward propagation operations for at least one layer of the neural network using the adjusted parameter.

16. The one or more non-transitory computer-readable storage devices or media of claim 15, wherein the performance metric comprises at least one of the following:

accuracy of the neural network;

change in accuracy of the neural network over two or more of training epochs of the neural network;

accuracy of at least one layer of the neural network;

change in accuracy of at least one layer of the neural network over two or more training epochs;

entropy of at least one layer of the neural network; or change in entropy of at least one layer of the neural network.

17. The one or more non-transitory computer-readable storage devices or media of claim 15, wherein:

the first floating point format is a block floating-point format; and the adjusted precision parameter causes the computer system to increase a number of mantissa bits of the first floating point format so that at least some of the activation values and/or weights of the modified neural network are stored in a second floating point format having an increased number of mantissa bits.

18. The one or more non-transitory computer-readable storage devices or media of claim 17, wherein:

the first floating point format stores at least one value with a mantissa having one, two, three, four, five, or size bits; and the second floating point format stores the at least one value with a mantissa having at least one more bits than the value in the first floating point format.

19. The one or more non-transitory computer-readable storage devices or media of claim 17, wherein the increased number of bits of mantissas in the second floating point format is selected using a rate distortion function.

20. The one or more non-transitory computer-readable storage devices or media of claim 15, wherein the first floating point format is a block floating-point format, and wherein the instructions further comprise:

computer-executable instructions that, when executed by the computing system, cause the computer system to, based on the adjusted precision parameter, modify the neural network to convert values from the first block floating-point format to a normal precision floating point format.

* * * * *